United States Patent

(12) United States Patent
Means

(10) Patent No.: US 10,178,025 B2
(45) Date of Patent: *Jan. 8, 2019

(54) METHODS AND APPARATUS TO ROUTE TRAFFIC IN A VIRTUAL PRIVATE NETWORK

(71) Applicant: AT&T Intellectual Property I, L.P., Atlanta, GA (US)

(72) Inventor: Israel Means, Chula Vista, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,881

(22) Filed: Jan. 9, 2017

(65) Prior Publication Data

US 2017/0118112 A1   Apr. 27, 2017

Related U.S. Application Data

(63) Continuation of application No. 14/541,125, filed on Nov. 13, 2014, now Pat. No. 9,560,017.

(51) Int. Cl.
*H04L 12/28* (2006.01)
*H04L 12/741* (2013.01)
*H04L 29/06* (2006.01)

(52) U.S. Cl.
CPC .......... *H04L 45/74* (2013.01); *H04L 63/0272* (2013.01)

(58) Field of Classification Search
CPC .......................... H04L 45/74; H04L 63/0272
See application file for complete search history.

(56) References Cited

U.S. PATENT DOCUMENTS 6,493,349 B1 * 12/2002 Casey ................. H04L 12/4675
370/409
6,594,703 B1    7/2003 Li
(Continued)

FOREIGN PATENT DOCUMENTS

EP    1946499    1/2012
JP    3764149    4/2006

OTHER PUBLICATIONS

Petr Lapukhov, "Understanding BGP Convergence," retrieved from http://blog.ine.com/2010/11/22/understanding-bgp-convergence/, Nov. 22, 2010, 12 pages.

(Continued)

*Primary Examiner* — Maharishi V Khirodhar
(74) *Attorney, Agent, or Firm* — Hanley, Flight & Zimmerman, LLC

(57) ABSTRACT

Methods and apparatus to route traffic in a virtual private network are disclosed herein. Example methods include replacing, by executing an instruction with a processor at a first provider router, a first next hop address included in first route information with a second next hop address. The first next hop address identifies a first edge router of a plurality of edge routers in a first region and the second next hop address identifies the first provider router. The provider router is not at an edge of a provider network included in the virtual private network and the first route information identifies a first route to a customer address in a customer network coupled to the first edge router. The methods also include advertising the first route information having the second next hop address to the plurality of edge routers if data traffic is to access a service.

20 Claims, 8 Drawing Sheets

(56) References Cited

U.S. PATENT DOCUMENTS

| | | | |
|---|---|---|---|
| 7,075,933 | B2 | 7/2006 | Aysan |
| 7,792,123 | B2 | 9/2010 | Hu |
| 7,835,378 | B2 | 11/2010 | Wijnands et al. |
| 7,936,754 | B2 | 5/2011 | Napierala |
| 7,969,978 | B2 | 6/2011 | Napierala |
| 8,179,905 | B1* | 5/2012 | Napierala ............ H04L 12/4641 370/237 |
| 8,391,185 | B2 | 3/2013 | Wijnands et al. |
| 8,532,124 | B2 | 9/2013 | Satterlee et al. |
| 8,549,616 | B2 | 10/2013 | Gerber et al. |
| 8,743,886 | B2 | 6/2014 | Pati et al. |
| 8,929,367 | B2* | 1/2015 | Satterlee ............. H04L 12/4641 370/389 |
| 2004/0037275 | A1 | 2/2004 | Li et al. |
| 2006/0029035 | A1 | 2/2006 | Chase et al. |
| 2007/0097974 | A1 | 5/2007 | Ward et al. |
| 2007/0165632 | A1 | 7/2007 | Zwiebel |
| 2008/0215880 | A1* | 9/2008 | Guichard ............ H04L 63/0272 713/162 |
| 2008/0267187 | A1* | 10/2008 | Kulmala ............. H04L 12/4641 370/392 |
| 2009/0092140 | A1 | 4/2009 | Gibbons et al. |
| 2009/0097490 | A1 | 4/2009 | Sanderson et al. |
| 2010/0085957 | A1* | 4/2010 | Elias ....................... H04L 45/04 370/352 |
| 2013/0177018 | A1 | 7/2013 | Wijnands et al. |
| 2013/0182710 | A1* | 7/2013 | Scholl .................... H04L 45/02 370/392 |
| 2014/0040483 | A1 | 2/2014 | Van Dussen et al. |
| 2014/0215079 | A1 | 7/2014 | Penno et al. |

OTHER PUBLICATIONS

Isocore, "Validation of Cisco ASR 1000: BGP Route-Reflector Control Plane Scaling and Convergence Layer 3 VPN Provider Edge Scale and Performance," retrieved from http://www.cisco.com/c/dam/en/us/products/collateral/application-networking-services/wide-area-application-services-waas-software/ITD13029-ASR1000-RP2Validationv1_1.pdf, Mar. 20, 2009, 13 pages.

Kevin R. Fall, et al., "Routing tables: Is smaller really much better?," retrieved from http://www.eecs.berkeley.edu/~sylvia/papers/hotnets2009-final156.pdf, 2009, 6 pages.

Ross Callon, and M. Suzuki, "A framework for layer 3 provider-provisioned virtual private networks (PPVPNs))," retrieved from http://www.hjp.at/doc/rfc/rfc4110.html, Jul. 2005, 83 pages.

The Cisco Learning Network, "What is VRF," https://learningnetwork.cisco.com/thread/13875, May 25, 2010, 3 pages.

The Cisco Learning Network, "How route distinguisher work?," https://learningnetwork.cisco.com/thread/16398, Aug. 3, 2010, 7 pages.

Wikipedia, "Virtual private network," retrieved from Wikipedia on Dec. 3, 2014, 9 pages.

Wikipedia, "Border Gateway Protocol," retrieved from Wikipedia on Dec. 3, 2014, 16 pages.

Rekhter et al., "RFC—A Border Gateway Protocol 4 (BGP-4)," retrieved from http://tools.ietf.org/html/rfc4271, The Internet Society, Jan. 2006, 104 pages.

United States Patent and Trademark Office, "Non-Final Office Action", issued in connection with U.S. Appl. No. 14/541,125, dated Mar. 29, 2016 (15 pages).

United States Patent and Trademark Office, "Notice of Allowance", issued in connection with U.S. Appl. No. 14/541,125, dated Sep. 14, 2016 (9 pages).

\* cited by examiner

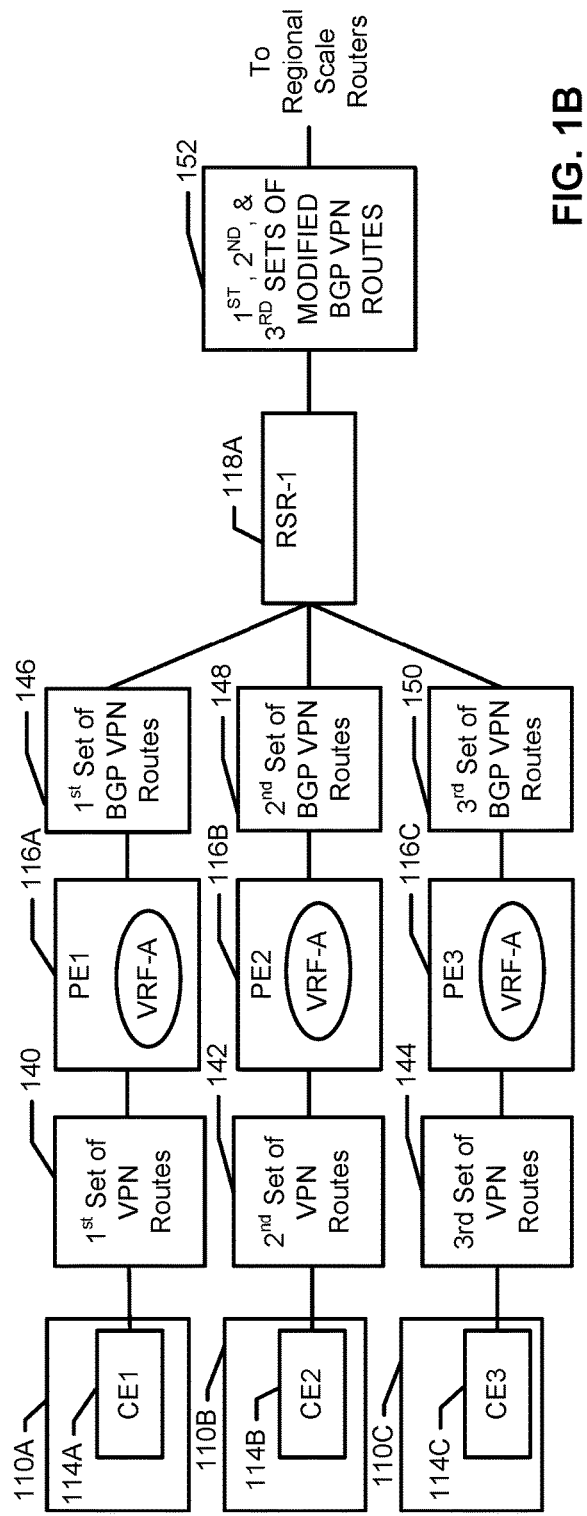

METHODS AND APPARATUS TO ROUTE TRAFFIC IN A VIRTUAL PRIVATE NETWORK

RELATED APPLICATION

This patent arises from a continuation of U.S. patent application Ser. No. 14/541,125, entitled, "Method and Apparatus To Route Traffic in a Virtual Private Network," filed Nov. 13, 2014 (now U.S. Pat. No. 9,560,017), which is hereby incorporated herein by reference in its entirety. Priority to U.S. patent application Ser. No. 14/541,125, is claimed.

FIELD OF THE DISCLOSURE

This disclosure relates generally to virtual private networks and, more particularly, to routing traffic in a virtual private network.

BACKGROUND

Virtual private networks ("VPN(s)") are used to transmit a customer's information across a shared provider network while maintaining the privacy of the transmitted customer information. The VPN includes a customer-controlled portion ("the customer network") having multiple, remote sites ("customer sites") and a provider-controlled portion ("the provider network") to link the remote customer sites. Customer edge routers at the customer sites are coupled to provider edge routers located at the edge of the provider network to couple the customer-controller portion to the provider-controlled portion. The customer's information is isolated from other information transmitted via the shared provider network by using separate routing tables to route information on the VPN. The routing tables, also called virtual routing and forwarding instances (VRFs), are installed in each provider edge router. To enable communication between the customer sites attached to different provider edge routers, the routes in the VRFs are shared among the provider edge routers. As a result, the size of the routing tables can become quite large, thereby placing a strain on provider edge routers. In fact, some provider edge routers lack the memory and CPU processing power needed to effectively operate due to the large and ever-growing size of the routing tables.

BRIEF DESCRIPTION OF THE DRAWINGS

FIG. 1B is a block diagram illustrating an example transfer of sets of routes among the routers of FIG. 1A.

FIG. 1C is a table illustrating a route prior to, and after, modification.

Figure 1A:
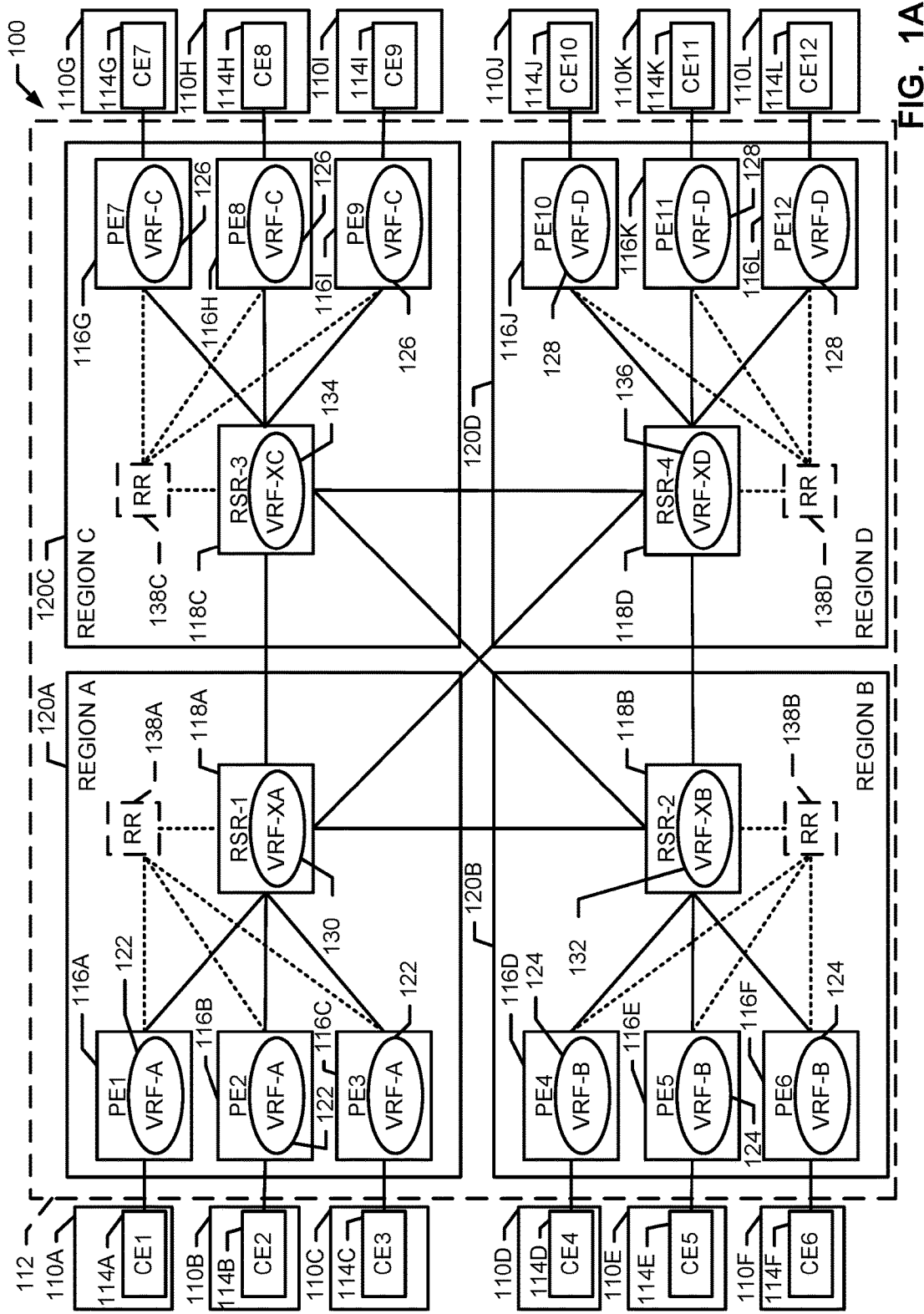
FIG. 1A is a block diagram of an example provider network having example regional scale routers and example provider edge routers coupled to example customer edge routers.

Wherever possible, the same reference numbers will be used throughout the drawing(s) and accompanying written description to refer to the same or like parts. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

DETAILED DESCRIPTION

Methods and apparatus to route traffic in a virtual private network are disclosed herein. Some example methods to route traffic in a virtual private network include receiving, at a first provider router, first route information from a provider edge router that is not at an edge of the provider network included in the virtual private network. The first route information identifies a customer address in a customer network coupled to the provider edge router. Some examples methods further include replacing, at the first provider router, a first next hop address included in the first route information with a second next hop address. In some examples, the first next hop address identifies the provider edge router and the second next hop address identifies the first provider router. Further examples include advertising the first route information to a second provider router located in a different region than the first provider router.

In some examples, the first provider router is located in a first region and the methods also include preventing second route information received from routers located outside of the first region from being advertised to provider edge routers located in the first region.

In some examples, before advertising the first route information a first route target identifying a first set of routers is replaced with a second route target identifying a second set of routers that does not include provider edge routers. The route information further includes a first route distinguisher associated with a first virtual forwarding and routing instance at the provider edge router and before advertising the route information, the first route distinguisher is replaced with a second route distinguisher associated with a second virtual forwarding and routing instance at the first provider router.

In some examples, the method can include, before modifying the first route information, storing the first route information in a forwarding table in the first provider router. The first route information is stored in the forwarding table and by the first provider router to forward a data packet received from the second provider router to the provider edge router.

In some examples, the method includes determining whether data traffic on a first route defined by the first router information is to access a service, and if the data traffic on the route is to access the service, advertising the first route information to a set of provider edge routers located in a same region as the first provider router. In some examples, the first provider router supplies the data traffic access to the service. In some examples, after the first route information has been modified, a preference value is assigned to the first route information. The preference value causes the first route to be preferred over a second route defined by the first route information prior to modification.

Computer readable instructions are also disclosed herein. In some examples, the computer readable instructions, when executed, cause a computer to modify route information received from a provider edge router to replace a first next hop address included in the route information with a second next hop address. The first next hop address identifies the provider edge router and the second next hop address identifies a first provider router in a first region. The instructions also cause a computer to advertise the route information to a second provider router in a second region and the modified route information causes the second provider router to direct data traffic intended for a customer destination identified in the route information to the first provider router.

Further example computer readable instructions disclosed herein cause a computer to replace a first route distinguisher associated with a first virtual forwarding and routing instance with a second route distinguisher associated with a second virtual forwarding and routing instance at the first provider router. The route distinguishers are replaced before the route information is advertised. In some examples, the instructions are further to cause the computer to store the route information, before it is modified, in a forwarding table in the first provider router. The route information stored in the forwarding table is used by the first provider router to forward a data packet received from the second provider router to the provider edge router.

Example apparatus to route traffic in a virtual private network are also disclosed herein. Some of the disclosed example apparatus include a memory having machine readable instructions stored thereon and a processor to execute the instructions to perform operations. In some examples, the operations include modifying route information received from a provider edge router to replace a first next hop address included in the route information with a second next hop address. The first next hop address identifies a provider edge router and the second next hop address identifies a first provider router. Example operations disclosed herein also include advertising the route information to a second provider router. The route information is to cause the second provider router to direct route traffic intended for a customer destination associated with the route information to the first provider router. In some examples, the route information includes a first route target identifying a second provider edge router, and the operations further include, before advertising the route information, replacing the first route target with a second route target that identifies the second provider router. In some examples, the second route target is not to include provider edge routers. In some examples, the route information further includes a first route distinguisher associated with a first virtual forwarding and routing instance at the provider edge router, and the operations further include, before advertising the route information, replacing the first route distinguisher with a second route distinguisher that is associated with a second virtual forwarding and routing instance at the first provider router.

In some examples, the operations also include, before modifying the route information, storing the route information in a forwarding table in the first provider router. The route information stored in the forwarding table is to be used by the first provider router to forward a data packet received from the second provider router to the provider edge router. Some example operations further include determining whether data traffic on a route defined by the route information is to access a service, and, if the data traffic on the route is to access the service, advertising the modified route information to a set of provider edge routers located in a same region as a customer destination identified in the route information.

A provider network is often used to couple customer network sites. To maintain the privacy of information transmitted between the customer sites via the provider network, a virtual private network ("VPN") is established using a set of virtual routing and forwarding instances (VRFs) stored on a set of provider edge routers. Each provider edge router is coupled to a customer edge router and, thus, sits at the "edge" of the provider network. Route information stored in the VRFs on each such provider edge router identifies customer addresses. Each such customer address stored in the VRF is associated with a provider edge router through which the customer address can be reached. In a typical VPN, all provider edge routers associated with the VPN are to store the routes that are reachable by all other provider edge routers associated with the VPN to form what is known as an "any to any" communication network.

In a typical VPN, the provider edge routers are coupled to each other via provider routers that form the backbone of the provider network. The provider routers do not store route information concerning the customer addresses, but instead store route information that can be used to reach the edge routers. Thus, in a typical VPN, only the edge routers are configured to store routes that terminate at a customer destination.

In many instances, multiple customers use a same provider edge router to connect to the provider network. To keep each VPN isolated from other VPNs, the routing information associated with each VPN is stored in a different VRF table at the provider edge routers. By storing the routes for each VPN in a different VRF, the provider edge router can support the formation of multiple VPNs for multiple customers and the customers can have internal addresses that overlap without causing address conflicts.

Unfortunately, due to an ever-increasing number of VPN routes and the fact that each provider edge router is required to store the VPN routes of all other provider edge routers, the number and size of the VRFs can become quite large thereby placing a strain on the limited processing power and memory capacity of provider edge routers. Existing techniques to lessen the burden on existing provider edge routers include installing additional edge routers to support the VPNs. However, adding more provider edge routers can be a costly solution that results in increased network complexity.

Example methods, apparatus, systems and articles of manufacture disclosed herein address some of these issues by off-loading the storage of non-local VPN routes from the provider edge routers to a specialized (non-edge) provider router referred to as a regional scale router having enhanced processing power and memory capacity.

To enable communication among the customer sites and provider edge routers in a same geographical region, a provider edge router advertises a first set of VPN routes to a specialized P router, referred to as a regional scale router, and to any provider edge routers located in the same geographical region. Upon receiving the advertised first set of VPN routes, the regional scale router modifies an attribute(s) associated with each of the first set of VPN routes and then advertises the modified VPN routes to remote regional scale routers located in other geographical regions. A route attribute is a characteristic associated with a route/ path. Some attributes are mandatory and affect which of several paths will be selected by a router to route a data packet and other attributes are optional and affect how a VPN route will be advertised and/or whether an advertised VPN route will be stored by a target router. Some of the attributes modified at the regional scale router can include a next hop address, a route distinguisher, a route target, a route originator identifier, and a route preference value.

As described further below, the VPN routes are modified in a manner that causes all non-local VPN routes (routes originating in one geographical region and having a destination in another geographical region) to be stored at the regional scale routers instead of the provider edge routers and further causes all data traffic to be routed through the regional scale routers where the non-local routes are stored.

In some examples, the regional scale router modifies the next hop address included in a VPN route. The next hop address included in the VPN route identifies the provider edge router (referred to as the "PE router") that can be used to reach a corresponding customer destination address. In a typical VPN, PE routers store route information identifying customer destination addresses and, for each customer destination address, an address of a PE router through which the customer destination address can be reached.

As described above, each PE router in the VPN stores VPN route information identifying customer addresses reachable by every other PE edge router in the VPN and the identity of the PE router through which the customer destination address is reachable. In practice, a VPN provider edge router (referred to as the "ingress PE router") that receives a data packet from a customer edge router analyzes the data packet to identify a customer destination address to which the data packet is to be transmitted. The ingress PE router then uses a VRF corresponding to the customer VPN to identify a PE router through which the customer address can be reached (referred to as the "egress PE router"). The ingress PE router then attaches information to the data packet identifying the egress PE router and transmits the data packet to one or more provider routers (referred to as "P routers"). In a typical VPN, the P routers are used to couple the PE routers and form of the backbone of the provider network. Typical VPN P routers do not store VPN route information identifying the customer addresses but instead store route information that can be used to reach the PE routers. The data packet is forwarded by the P routers to the egress PE router which then forwards the data packet to the customer destination address.

As described above, in some examples, a specialized (non-edge) P router referred to as a regional scale router modifies a VPN route advertised by a local PE router by changing the next hop address of the route to identify the regional scale router instead of the egress PE router. Thus, after the next hop modification and the modified route is advertised to other regional scale routers, the regional scale router that performed the modification (although not a PE router (not on the edge of the VPN)) appears to be a PE router for that VPN route (e.g., appears to be located at the edge of the provider network).

In addition, the regional scale router modifies the route originator identifier ("ID") by replacing an existing route originator-ID with a new route originator-ID. The existing route originator-ID identifies, for example, an egress PE router as the originator of the route and the replacement route originator-ID identifies the regional scale router as the originator of the route. Thus, after the route originator-ID has been replaced, each VPN route appears to have originated in the regional scale router instead of the egress PE router.

In some examples, the regional scale routers further modify the routes by replacing an existing route target of each VPN route with a replacement route target. A route target is a route attribute that identifies the router(s)/device(s) that are to store an advertised route. In some examples, the existing route target identifies the VPN PE routers coupled to the customer sites and the replacement route target identifies any and/or all of the regional scale routers. By modifying the route targets in this manner, the PE routers are prevented from storing non-local routes (e.g., routes to customer sites located in remote regions). Thus, all non-local routes are stored at the regional scale routers to alleviate the storage and processing burden placed on the PE routers.

In some examples, the regional scale router further modifies each VPN route by changing a route distinguisher attribute associated with the route. The route distinguisher attribute allows an address used by a first customer to be distinguished from the same address used by a second customer. As such, each VRF is assigned a single, unique route distinguisher. The regional scale router modifies the route distinguisher of a VPN route by replacing an existing route distinguisher assigned to the VRF of the PE router with a replacement route distinguisher assigned to the VRF of the regional scale router. Modifying the route distinguisher in this manner allows the regional scale router to identify which of several VRF's has route information needed to forward a data packet.

After the modifications are performed, the modified routes are advertised by the local regional scale router that performed the modifications. Upon receipt of the modified routes, the remote regional scale routers identified as route targets store the routes for use in directing data traffic to the regional scale router that advertised the routes. The remote regional scale routers similarly modify the routes supplied by respective, local PE routers (i.e., PE routers located in the same respective region) and advertise the modified routes to the other regional scale routers.

As a result of the VPN route modifications, all non-local data traffic is directed from the customer edge routers through the regional scale routers, which use the stored non-local routes to forward the non-local data traffic across the provider network. As a further result, the existence of the PE routers is masked from the remote regional scale routers such that the regional scale routers appear to be the PE routers of the VPN from the perspective of other regional scale routers. Thus, the remote regional scale routers are prevented from sending data traffic directly to a non-local PE router. Also, because the route targets are modified to identify the regional scale routers, the non-local routes are not stored at, nor accessible to, the PE edge routers.

In some examples, the PE routers are configured to route a data packet destined for a non-local VPN route to a default address identifying a local regional scale router. In some examples, upon receiving a data packet from a customer edge router, the PE routers are configured to search a locally-stored routing table and, if a corresponding VPN route for a data packet is not found, the PE router is configured to transmit the data packet to a default route address associated with the local regional scale router. The local regional scale router, upon receiving the data packet, obtains a corresponding VPN route from a corresponding VRF. The corresponding VPN route identifies an appropriate remote regional scale router and is used to transmit the data packet(s) to the remote regional scale router.

In some examples, the VPN route information is modified in a manner that restricts the flow of inter-regional communication. In some such examples, the route target associated with one or more of the routes is modified to identify a subset of the regional scale routers instead of, for example, all of the regional scale routers. In some examples, a first regional scale router modifies VPN route information by replacing an existing route target that identifies all of the regional scale routers with a new route target that identifies only a second regional scale router. Thus, when the modified VPN route information is advertised, only the second regional scale router will store the modified routes. As such, only the second regional scale router will have routes to the first regional scale router such that only the second regional scale router will be able to communicate data traffic to the first regional scale router.

In some examples, the regional scale routers are adapted to provide enhanced data communication services such as a firewall service, an intrusion prevention service, voice over IP (Internet Protocol) services, load balancing services, a service that blocks Internet usage, video signal processing services, services provided via cloud based computer networks, etc. By providing such enhanced services at the regional scale routers, the need to supply the services at each individual PE router is eliminated. Thus, less sophisticated and less expensive routers can be used to implement provider edge routers thereby resulting in cost savings.

In some examples, when a local VPN route emanating from a provider edge router is to receive an enhanced data communication service, the local VPN route is redirected through the local regional scale router for application of (access to) the enhanced data communication service. In some examples, the regional scale router redirects the VPN route through the local regional scale router by modifying the next hop address and the route distinguisher of the corresponding VPN route and assigning a preference value to the modified route. The regional scale router advertises the modified VPN route information to the local PE routers. Thus, in such examples, the local PE routers have two possible routes to transmit information to a same local customer destination address. A first such possible VPN route is advertised by a local PE router and extends from one local PE router to another local PE router (thereby bypassing the regional scale router). A second such possible VPN route is advertised by a local regional scale router and extends from one local PE router to the regional scale router and then to another local PE router. A local PE router having stored both the first and second possible routes will choose the second VPN route through the regional scale router due to the preference value assigned to the second route. By routing data traffic through the preferred second VPN route in this manner, the data traffic is able to be processed at the regional scale router to receive the enhanced service.

Thus, the methods, systems, apparatus and articles of manufacture disclosed herein off-load non-local routes from the PE router(s) to a regional scale router and cause all non-local traffic to be routed through the regional scale router. By removing non-local VPN routes from the PE routers, the amount of routing information stored at the PE routers is greatly reduced, thereby easing the processing and memory demands placed on the limited-capacity PE routers. Similarly, because enhanced data services are applied at the regional scale router instead of being applied at each individual PE router, the number of sophisticated routers having the capacity needed to supply enhanced data services is reduced, thereby resulting in lower cost. In addition, the methods, systems and apparatus described herein provide enhanced traffic routing capabilities by providing the ability to restrict communication between regions, as desired.

FIG. 1 is a block diagram of an example virtual private network 100 having multiple customer sites 110A, 110B, 110C, 110D, 110E, 110F, 110G, 110H, 110I, 110J, 110K, 110L, and a provider-controlled portion ("the provider network") 112 to link the remote customer sites 110A-110L. Customer edge ("CE") routers (including a first CE router ("the CE1 router") 114A, a second CE router ("the CE2 router") 114B, a third CE router ("the CE3 router") 114C, a fourth CE router ("the CE4 router") 114D, a fifth CE router ("the CE5 router") 114E, a sixth CE router ("the CE6 router") 114F, a seventh CE router ("the CE7 router") 114G, an eight CE router ("the CE8 router") 114H, a ninth CE router ("the CE9 router") 114I, a tenth CE router ("the CE10 router") 114J, an eleventh CE router ("the CE11 router") 114K, and a twelfth CE router ("the CE12 router") 114L) are located at the respective customer sites 110A, 110B, 110C, 110D, 110E, 110F, 110G, 110H, 110I, 110J, 110K, 110L and are coupled to respective provider edge ("PE") routers (e.g., a first PE router ("the PE1 router") 116A, a second PE router ("the PE2 router") 116B, a third PE router ("the PE3 router") 116C, a fourth PE router ("the PE4 router") 116D, a fifth PE router ("the PE5 router") 116E, a sixth PE router ("the PE6 router") 116F, a seventh PE router ("the PE7 router") 116G, an eighth PE router ("the PE8 router") 116H, a ninth PE router ("the PE9 router") 116I, a tenth PE router ("the PE10 router") 116J, an eleventh PE router ("the PE11 router") 116K, and a twelfth PE router ("the PE12 router") 116L), located at the edges of the provider network 112. In the illustrated example of FIG. 1, the PE1 router 116A, the PE2 router 116B, and the PE3 router 116C are coupled to a first regional scale router 118A located in a first geographical region ("Region A") 120A. The PE4 router 116D, the PE5 router 116E and the PE6 router 116F are coupled to a second regional scale router 118B located in a second geographical region ("Region B") 120B. The PE7 router 116G, the PE8 router 116H and the PE9 router 116I are coupled to an example third regional scale router 118C located in an example third geographical region ("Region C") 120C and the PE10 router 116J, the PE11 router 116K, and the PE12 router 116L are coupled to an example fourth regional scale router 118D located in an example fourth geographical region ("Region D") 120D.

Customer VPN route information is isolated from other information transmitted via the shared provider network 112 by using separate virtual routing and forwarding instances (VRFs) to store customer routes by which data traffic originating at one customer site (e.g., the first customer site 110A) can be routed via the provider network 112 to any other customer site (e.g., the twelfth customer site 110L). In the illustrated example, a first VRF ("VRF-A") 122 is stored at the PE1 router 116A, the PE2 router 116B and the PE3 router 116C, a second VRF ("VRF-B" 124) is stored at the PE4 router 116D, the PE5 router 116E and the PE6 router 116F, a third VRF ("VRF-C" 126) is stored at the PE7 router 116G, the PE8 router 116H and the PE9 router 116I and a fourth VRF ("VRF-D" 128) is stored at the PE10 router 116J, the PE11 router 116K and the PE12 router 116L. In addition, a fifth VRF ("VRF-XA") 130 is stored at the first regional scale router 118A, a sixth VRF ("VRF-XB") 132 is stored at the second regional scale router 118B, a seventh VRF ("VRF-XC") 134 is stored at the third regional scale router 118C, and an eighth VRF ("VRF-D") 136 is stored at the fourth regional scale router 118D.

The CE routers (e.g., the CE1 router 114A, the CE2 router 114 B, etc.) transfer reachability information to the respective PE routers (e.g., the PE1 router 116A, the PE2 router 116B, etc.). The reachability information includes a set of routes to customer addresses at the customer sites that are reachable by the CE routers (e.g., the CE1 router 114A, the CE2 router 114 B, etc.). The PE routers (e.g., the PE1 router 116A, the PE2 router 116B, etc.) store the set of routes in the respective VRF (e.g., VRF-A 122, VRF-B 124, etc.) and also transfer the routes to the respective regional scale routers (e.g., the first regional scale router 118A, the second regional scale router 118B, the third regional scale router 118C, and the fourth regional scale router 118D). In some examples, the transfer of VPN route information, also referred to as route advertising, is performed using example route reflectors. In the illustrated example of FIG. 1, an example first route reflector 138A is used to transfer VPN route information among the PE1 router 116A, the PE2 router 116B, the PE3 router 116C and the first regional scale router 118A, an example second route reflector 138B is used to transfer VPN route information among the PE4 router 116D, the PE5 router 116E, the PE6 router 116F, and the second regional scale router 118B, an example third route reflector 138C is used to transfer VPN route information among the PE7 router 116G, the PE8 router 116H, the PE9 router 116I and the third regional scale router 118C, and an example fourth route reflector 138D is used to transfer VPN route information among the PE10 router 118J, the PE11 router 118K, the PE12 router 118L and the fourth regional scale router 118D. As described further below, the regional scale routers store the set of routes in a respective regional scale router VRF (e.g., VRF-XA 130, VRF-XB 132, VRF-XC 134, VRF-XD 136).

Referring also to the illustrated example of FIG. 1B, the example CE1 router 114A supplies the PE1 router 116A with a first set of routes 140 to addresses at the first customer site 110A that are reachable via the CE1 router 114A. Likewise, the CE2 router 114B supplies the PE2 router 116B with a second set of routes 142 to addresses at the second customer site 110B that are reachable via the CE2 router 114B. And the CE3 router 114C supplies the PE3 router 116C with a third set of routes 144 to addresses at the third customer site 110C that are reachable via the CE3 router 114C. In some examples, the first, second and third set of routes are supplied in any desired format/protocol. In the illustrated example, the PE1 router 116A, the PE2 router 116B, and the PE3 router 116C convert the routes to a Border Gateway Protocol ("BGP") to form a first set of BGP routes 146, a second set of BGP routes 148 and a third set of BGP routes 150. The first, second and third sets of BGP routes 146, 148 and 150 are shared among the PE1 router 116A, the PE2 router 116B, and the PE3 router 116C and stored in the VRF-A 122 residing in each of the PE1 router 116A, the PE2 router 116B, and the PE3 router 116C.

Each of the BGP routes in the first, second and third sets of BGP routes 146, 148, 150 includes a customer destination Internet Protocol ("IP") address uniquely identifying a reachable address at a corresponding customer site (e.g., the first customer site 110A, the second customer site 110B and the third customer site 110C) and includes the address of the corresponding PE router (e.g., the PE1 router 116A, the PE2 router 116B, or the PE3 router 116C) through which the customer destination IP address can be reached. Referring also to the table illustrated in FIG. 1C, an example first BGP VPN route 154 associated with a first customer destination located at the first customer site 110A includes a first customer destination IP address corresponding to the first customer destination located at the customer site 110A and further includes a "next hop address" identifying the address of the PE1 router 116A. Generally, the next hop address field identifies the address of a router through which the customer destination can be reached.

Additionally, the first BGP VPN route 154 includes a route distinguisher that uniquely identifies the VRF-A. The route distinguisher is used to distinguish a set of routes associated with one customer's VPN from another set of routes associated with another customer's VPN. Thus, the route distinguisher unique to the VRF-A ("RD VRF-A") is prepended to all of the VRF-A routes when the routes are advertised by the PE1 router 116A, the PE2 router 116B, and/or the PE3 router 116C. A route distinguisher is typically formatted as a 64 bit value comprising three fields. A type field, an administrator field and a value field. In some examples, the customer destination IP address is formatted as an Internet Protocol version 4 ("IPv4") address or as an Internet Protocol version 6 ("IPv6") address the route distinguisher is prepended to the customer destination IP address.

The first BGP VPN route 154 further includes a route target identifying a router(s) that is to import and store the first BGP VPN route 154 when the first BGP VPN route 154 is advertised. In a typical VPN, all provider edge routers associated with the VPN are to store the routes that are reachable by all other provider edge routers associated with the VPN to form what is known as an "any to any" communication network. Thus, if the VPN 100 of FIG. 1 were a typical VPN, the route target would identify all of the provider edge routers included in the VPN. As a result, each provider edge router of the VPN 100 (e.g., the PE1 router 116A, the PE2 router 116B, the PE3 router 116, the PE4 router 116D, the PE5 router 116E, the PE6 router 116F, the PE7 router 116G, the PE8 router 116H, the PE9 router 116I, the PE10 router 116J, the PE11 router 116K and the PE 12 router 116L) would have to store all of the customer routes accessible by all of the other provider edge routers of the VPN 100 thereby placing a large burden on the memory capacity and processing power of the provider edge routers.

In contrast, the provider edge routers of the VPN 100 illustrated in FIG. 1 (e.g., the PE1 router 116A, the PE2 router 116B, the PE3 router 116, the PE4 router 116D, the PE5 router 116E, the PE6 router 116F, the PE7 router 116G, the PE8 router 116H, the PE9 router 116I, the PE10 router 116J, the PE11 router 116K and the PE 12 router 116L) are configured to store the local routes (e.g., routes accessible via the customer edge routers in a same geographical region as the provider edge router), but are not configured to store the non-local routes (e.g., routes accessible via the customer edge routers located in geographical regions remote from the provider edge router). To achieve this storage schema, the route target used for the routes to be stored in the VRF-A identifies an address of each of the provider edge routers located in the Region A 120 A (the first PE1 router 116A, the PE2 router 116B, the PE3 router 116C) and further identifies an address of the first regional scale router 118A, also located in the Region A 120A. Thus, the first VPN route includes a route target that identifies the PE1 116A, the PE2 116B, the PE3 116C and the first regional scale router 118. The routers that are included in a specific route target are configured to import/save routes having the route target.

The first BGP VPN route 154 additionally includes a route originator-ID that identifies a router at which the first VPN route originated within a network. The route originator is used to prevent route looping which can occur when a route is distributed through a set of route reflectors and is sent back to the PE router that originated the route. When a route originator is attached to a route, a router receiving the VPN route in an advertisement will only import/save the advertised VPN route if the VPN route originated with a different router and will discard routes that originated at the same router. Thus, the first BGP VPN route 154 includes: 1) an IPv4 address of a customer destination, 2) a next hop address identifying the address of the PE1 router 116A, 3) a route distinguisher identifying the VRF-A 122, 4) a route target identifying the PE2 router 116B, the PE3 router 116C, and the first regional scale router 118A (e.g., all of the VPN 100 routers in the Region A 120A), and 5) a route originator-ID identifying the PE1 router 116A. In some examples, the first VPN route can also include any number of additional fields of information (e.g., BGP VPN route attributes). The PE1 router 116A, the PE2 router 116B, and the PE3 router 116C convert all of the routes supplied by the CE1 router 114A, the CE2 router 114B, the CE3 router 114C in the same manner described with respect to generating the first BGP route. The first, second and third sets of BGP routes 146, 148, 150 are stored by each of the PE1 router 116A, the PE2 router 116B, and the PE3 router 116C and used as reachability information (e.g., the first, second and third sets of routes 146, 148, 150 include routes to customer destinations that can be reached via the PE1 router 116A, the PE2 router 116B, and the PE3 router 116C, respectively).

After the routes included in the first, second and third sets of routes 140, 142, 144 have been converted to the BGP format in the manner described above, the example PE1 router 116A, the example PE2 router 116B, and the example PE3 router 116C exchange the reachability information via, for example, the first route reflector 138A. Each of the PE1 router 116A, the PE2 router 116B, and the PE3 router 116C store the shared routes included in the reachability information in a routing table containing local routes (routes that terminate in the Region A 120A). As described in greater detail below, the routing table containing the local routes, also called a local routing table, is used by each of the PE1 router 116A, the PE2 router 116B and the PE3 router 116C to populate a forwarding table used to forward data packets to the addresses associated with the local routes in the routing table. In addition, one or more of a set of interfaces associated with the PE1 router 116A are designated to receive routes and data traffic from the CE1 router 114A, one or more of a set of interfaces associated with the PE2 router 116B are designated to receive routes and data traffic from the CE2 router 114B, and one or more of a set of interfaces associated with the PE3 router 116C are designated to receive routes and data traffic from the CE3 router 114C. Information identifying which such interfaces are designated to receive data from the customer routers (e.g., the CE1 router 114A, the CE2 router 114B and the CE3 router 114C) may be recorded in corresponding routing and/or forwarding tables or in another data set of the VRF-A 122. In some examples, the PE1 router 114A, the PE2 router 114B and the PE3 114C, upon receiving a data packet on one of the designated interfaces, are configured to consult the VRF-A 122 to identify a VPN route by which the data packet will be transmitted. In some examples, the reachability route information, local route table, the forwarding table and the interface information form the VRF-A 122.

As will be described further below, the PE1 router 116A, the PE2 router 116B, and the PE3 router 116C are configured to transmit data packets destined for non-local customer sites (e.g., customer sites not locate in Region A) to the first regional scale router 118A. In some examples, the PE1 router 116A, the PE2 router 116B, and the PE3 router 116C upon receiving a data packet destined for a non-local customer site are configured to consult the VRF-A forwarding table for a VPN route corresponding to the packet destination address and, when such a VPN route cannot be located, to transfer the data packet to the first regional scale router 118A using a default route. Thus, in some examples, the PE1 router 116A, the PE2 router 116B, and the PE3 router 116C do not store non-local VPN routes.

Referring still to FIGS. 1A, 1B and 1C, in addition to sharing the converted routes stored in the reachability routing tables with each other, the PE1 router 116A, the PE2 router 116B, the PE3 router 116C advertise the reachability routes to the first regional scale router 118A via the route reflector 138A. Upon receiving the first, second and third sets of BGP routes 146, 148, 150 from the PE1 router 116A, the PE2 router 116B, and the PE3 router 116C, respectively, the example first regional scale router 118A stores the BGP routes for use in transmitting data packets to the customer sites 110A, 110B, 110C. In addition, the first regional scale router 118A modifies the BGP routes included in the first, second and third sets of BGP routes 146, 148, 150 to form a set of modified BGP routes 152. The first regional scale router 118A then advertises the modified routes to the remote regional scale routers (e.g., the second regional scale router 118B, the third regional scale router 118C, and the fourth regional scale router 118D). The modifications to the VPN route information can include modifications to one or more of the route attributes.

As described further below with reference to FIG. 2, the VPN route modifications made by the first regional scale router 118A cause the non-local data traffic (i.e., traffic to be routed from one customer site in one region to a customer site in another region) emanating from the PE1 router 116A, the PE2 router 116B, the PE3 router 116C in the Region A 120A to be directed through the first regional scale router 118A. Likewise, the VPN route modifications cause the non-local traffic emanating from the PE routers outside of the Region A 120A (e.g., the PE4 router 116D, the PE5 router 116E, the PE6 router 116F, the PE7 router 116G, the PE8 router 116H, the PE9 router 116I, the PE10 router 116J, the PE11 router 116K, the PE12 router 116L) and destined for the Region A 120A to be routed to the first regional scale router 118A for subsequent transmission to an appropriate one of the PE1 router 116A, the PE2 router 116B, and the PE3 router 116C. Routing the non-local traffic through the first regional scale router 118A permits offloading of the storage of non-local routes from the PE1 router 116A, the PE2 router 116B, and the PE3 router 116C to the first regional scale router 118A also in the Region A 120A.

Figure 2:
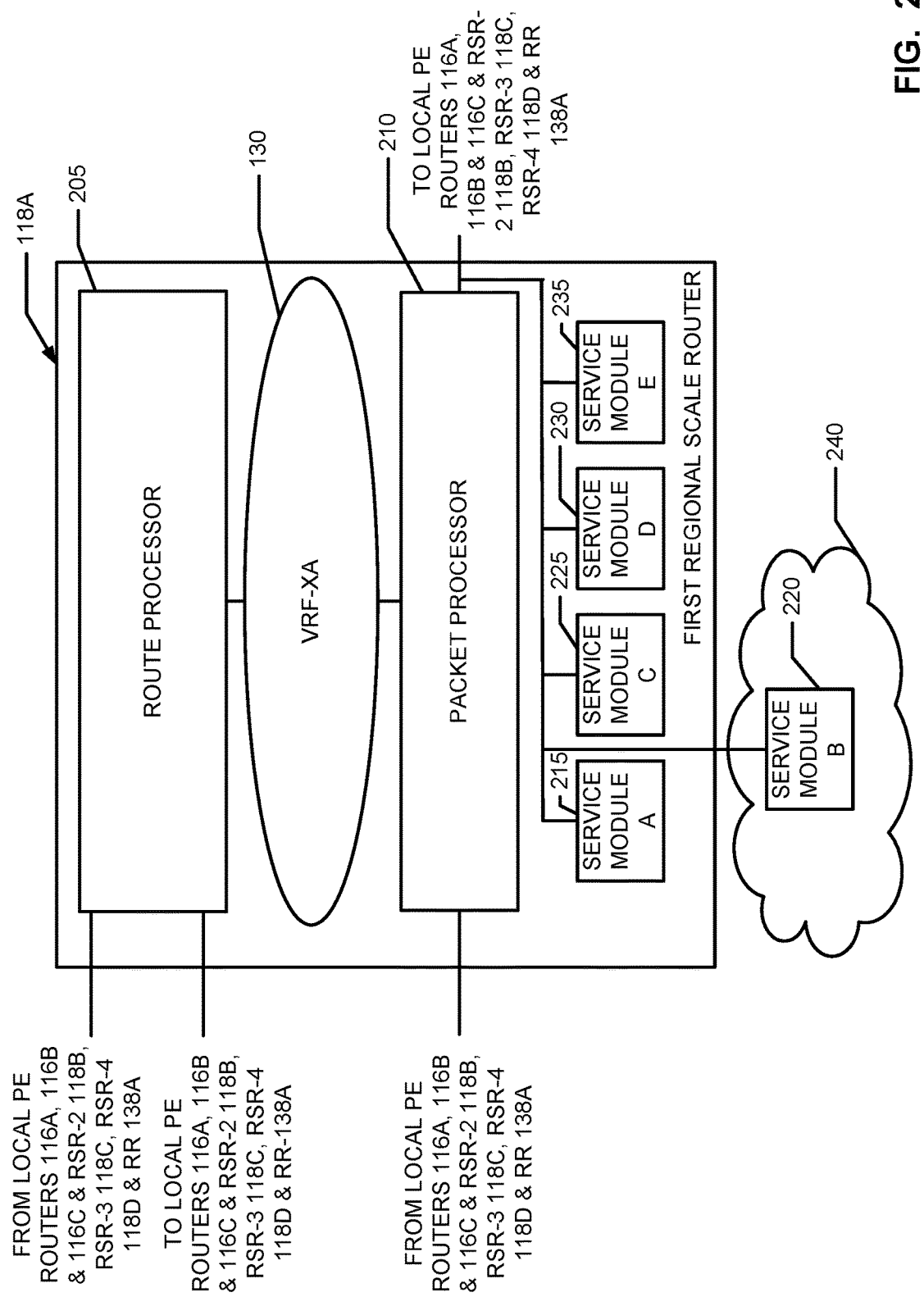
FIG. 2 is a block diagram of an example implementation of one of the example regional scale routers of FIG. 1.

FIG. 2 is a block diagram of the example first regional scale router 118A and the example VRF-XA 130 of FIG. 1. In the illustrated example, the first regional scale router 118A includes an example route processor 205 and an example packet processor 210, both of which are coupled to the VRF-XA 130. The route processor 205 receives routes advertised by the PE1 router 116A, the PE2 router 116B, the PE3 router 116C, the second regional scale router 118B, the third regional scale router 118C, and/or the fourth regional scale router 118D. The routes are stored in the VRF-XA 130 and, in some examples, modified by the route processor 205 before being stored. The packet processor 210 receives and processes packets of data to be transmitted via the VPN 100 of FIG. 1. The packet processor 210 uses routing information stored in the VRF-XA 130 to identify destinations for the data packets and transmits the packets accordingly. In some examples, the first regional scale router 118A additionally supplies services such as increased speed/enhanced bandwidth, voice over IP, etc. to one or more data packets traveling on the VPN 100 (see FIG. 1) via an example service module A 215, an example service module B 220, an example service module C 225, an example service module D 230, and/or an example service module E 235. In the illustrated example, the service module A 215, the service module C 225, the service module D 230, and the service module E are implemented by the first regional scale router 118A. In some examples, one or more of the services modules (the service module A 215, the service module C 225, the service module D 230, and/or the service module E) can instead be implemented as separate devices that are coupled to the first regional scale router 118A. In some examples, the service module B 220 resides in a computing cloud 240 and is configured to supply software as a service, storage as a service, etc. to a user(s) at one or more of the customer sites of FIG. 1 (e.g., the customer sites 110A-110L).

Figure 3:
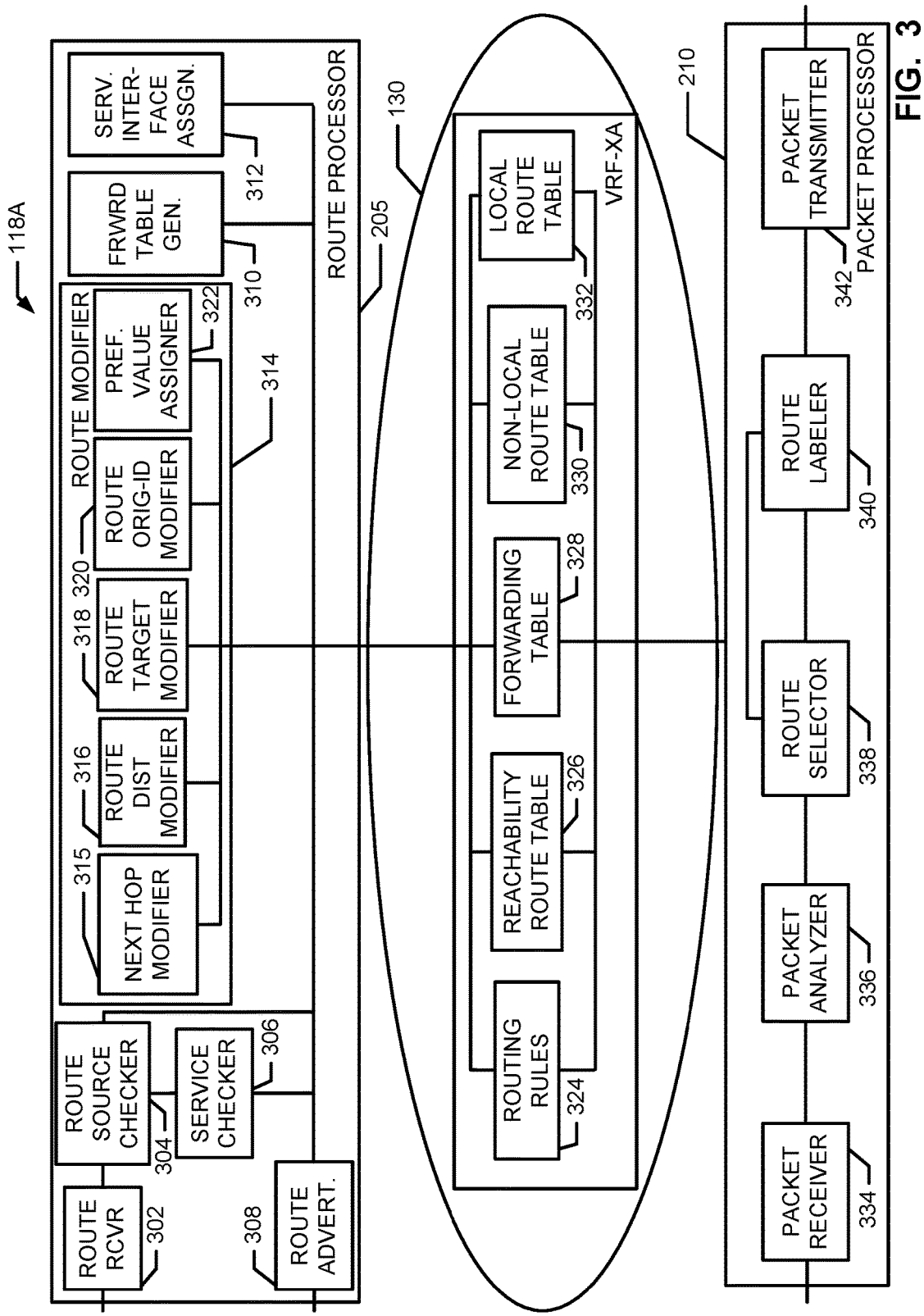
FIG. 3 is a block diagram of another example implementation of the regional scale router of FIG. 1.

FIG. 3 is a more detailed block diagram illustrating the example first regional scale router 118A and the VRF-XA 130 of FIG. 1 and FIG. 2. The first regional scale router 118A of the illustrated example includes the example route processor 205 and the example packet processor 210, both of which are coupled to the VRF-XA 130. In some examples, the route processor 205 includes an example route receiver 302, an example route source checker 304, an example service checker 306, an example route advertiser 308, an example forwarding table generator 310, an example service interface assigner 312, and an example route modifier 314. The example route modifier 314 includes an example next hop modifier 315, an example route distinguisher modifier 316, an example route target modifier 318, an example route originator-ID modifier 320, and an example preference value assigner 322. In the illustrated example, the VRF-XA 130 includes example routing rules 324, an example reachability route table 326, an example forwarding table 328, an example non-local route table 330, and an example local route table 332. In the illustrated example, the packet processor 210 includes an example packet receiver 334, an example packet analyzer 336, an example route selector 338, an example route labeler 340 and an example packet transmitter 342.

In some examples, the example route receiver 302 receives routes advertised by the PE1 router 116A, the PE2 router 116B, the PE3 router 116C, the second regional scale router 118B, the third regional scale router 118C and the fourth regional scale router 118D. Routes received at the route receiver 302 are supplied to the example route source checker 304. The route source checker 304 determines whether a received VPN route is local to the Region A 120A (i.e., whether the VPN route terminates at one of the customer sites 110A, 110B, 110C in the Region A 120A) or whether the received VPN route is a non-local VPN route (i.e., whether the VPN route terminates at one or more of the customers sites 110D, 110E, 110F in the Region B 120B, and/or one or more of the customer sites 110G, 110H, 110I in the region C 120C, and/or one or more of the customer sites 110J, 110K, 110L in the Region D 120D.

In some examples, if the example route source checker 304 determines that a received VPN route is non-local (e.g., the VPN route does not terminate in Region A 120A), the route source checker 304 causes the VPN route to be stored in the example non-local routing table 330 in the VRF-XA 130. As described further below, the non-local routes stored in the non-local route table 330 are used to forward data packets to non-local destinations. If the route source checker 304 determines that the received route is a local route (e.g., the VPN route terminates in the Region A 120A), the route source checker 304 causes the local VPN route to be stored in the example local route table 332 of the VRF-XA 130. As described further below, the local routes stored in the local route table 332 are used by the first regional scale router 118A to forward traffic received from remote regions (e.g., the Region B 120B, the Region C 120C, the Region D 120D) and, in some cases, received from the Region A 120A to one of the local provider edge routers (e.g., one of the PE1 router 116A, the PE2 router 116B, the PE3 router 116C).

After the local route is stored, the example service checker 306 checks the VPN route for information indicating that the packets transmitted via the VPN route are to receive and/or otherwise be associated with a data/communication service such as, for example, broadband, voice over IP, software as a service, storage as a service, enhanced speed, et. via one or more of the service modules (the service module A, the service module B, the service module C, the service module D, the service module E) of FIG. 2. If the VPN route is not to carry data packets that are designated to receive such a service, the VPN route is supplied to the example route modifier 314 for modification. The route modifier 314 is configured to modify the VPN route in the manner described below. The modified VPN route is later transmitted to and used by the remote regional scale routers of the Region B 120B, the Region C 120C, and the Region D 120D to transmit data packets back to a corresponding customer site (e.g., one of the customer sites 110A, 110B, 110C) of the Region A 120A. The manner in which the local routes are modified will cause non-local data (e.g., data emanating from the Region B 120B, the Region C 120C and/or the Region D 120D) intended for the Region A 120A to be transmitted to the first regional scale router 118A for subsequent transmission to one of the provider edge routers (e.g., the PE1 router 116A, the PE2 router 116B, the PE3 router 116C) instead of being be routed directly to the provider edge routers (e.g., the PE1 router 116A, the PE2 router 116B, the PE3 router 116C). Thus, as a result of the modifications, all traffic emanating from outside of the Region A 120A and destined for the Region A will be forced through the regional scale router 118A.

In some examples, the modifications performed by the route modifier 314 begin when the example next hop modifier 315 changes the next hop address to reflect the address of the first regional scale router 118A instead of an address of an edge router (e.g., PE1 router 116A, PE2 router 116B, PE3 router 116C). In addition, the example route distinguisher modifier 316 changes the route distinguisher from a first route distinguisher identifying the VRF-A 122 (see FIG. 1) to a second route distinguisher identifying the VRF-XA 130. As described above, a route distinguisher distinguishes one set of routes associated with a first VRF or customer from another set of routes associated with a different VRF or customer and takes the form of a unique number prepended to each VPN route advertised by a corresponding VRF and identifies the VPN route as belonging to that corresponding VRF (or customer).

The example route target modifier 318 then replaces a first route target with a second route target. In some examples, the first route target identifies all of the routers in the Region A 120A included in the VPN 100 (e.g., the PE1 router 116A, the PE2 router 116B, the PE3 router 116C and the first regional scale router 116A) and the second route target identifies all of the regional scale routers (e.g., the first regional scale router 118A, the second regional scale router 118B, the third regional scale router 118C, and the fourth regional scale router 118D. As described above, the route target identifies the router(s) that are to import and store the route data. Thus, when the VPN route is later advertised by the first regional scale router 116A, the modifications to the route target will cause the modified VPN route to be imported and stored in the second regional scale router 116B, the third regional scale router 116C, and the fourth regional scale router 116D. As a result, the regional scale routers, and not the provider edge routers, will store the non-local modified routes thereby offloading storage of the non-local routes from the provider edge routers of the VPN 100.

In some examples, the route information is modified in a manner that restricts the flow of inter-regional communication. In some such examples, the route target associated with the first route is modified to identify a subset of the regional scale routers (e.g., the second regional scale router 118B) instead of all of the regional scale routers. In some such examples, when the modified VPN route is advertised, only the second regional scale router will store the modified route. As such, only the second regional scale router will have access to and be able to communicate data to the customer destination IP address identified in the first route.

In the illustrated example, after the route target is modified, the example route originator ID modifier 320 changes the route originator-ID. As described above, the route originator ID identifies a router of the service provider network 112 at which the route originated (e.g., the route's point of ingress to the service provider network from a customer site). A route originator ID is added to a VPN route data so that, later, when the same VPN route data is advertised to the originating router by another network router and/or route reflector, the originating router will recognize the VPN route as being native to the router (e.g., having originated at the router) and will not attempt to import/save the VPN route data. Thus, the route originator-ID prevents loop back and/or route table flapping. In some examples, the route originator ID modifier 320 replaces a first route originator-ID of the VPN route data with a second route originator ID. In some examples, the first route originator ID identified the PE1 router 116A and the second route originator identifies the example first regional scale router 118A. As a result of the modification, if the VPN route returns to the first regional scale router 118A after having been advertised, the first regional scale router 118A will recognize the route originator-ID as being its own route originator-ID and will not attempt to import or store the modified BGP route.

By way of example, after modification by the route modifier 314, the first BGP VPN route 154 (see FIG. 1C) becomes the first modified BGP VPN route 156 (see FIG. 1C) and includes: 1) an IPv4 address of the first customer destination, 2) a next hop address identifying the address the regional scale router 118A, 3) a route distinguisher identifying the VRF-XA 130, 4) a route target identifying the regional scale routers, and 5) a route originator-ID identifying the first regional scale router 118A.

After having been modified in the manner described above, the modified BGP VPN route is stored in the example reachability route table 326 of the VRF-XA 130 and then advertised by an example route advertiser 308. The routers included in the route target (e.g., the example second regional scale router 118B, the example third regional scale router 118C, and the example fourth regional scale router 118D) will, upon receiving the modified BGP route, import and store the modified BGP VPN route in one or more non-local data routing tables. As a result, the second, third and fourth regional scale routers, 118A, 118B, 118C and 118D will store routes leading to the first regional scale router 118A and the first regional scale router 118A will store local routes (in the example local route table 332) leading to the provider edge routers located in the Region A 120A (e.g., the PE1 router 116A, the PE2 router 116B and the PE3 router 116C). In contrast, the provider edge routers located outside of the Region A 120A (e.g., the PE4 router 116D, the PE5 router 116E, the PE6 router 116F, the PE7 router 116G, the PE8 router 116H, the PE9 router 116I, the PE10 router 116J, the PE11 router 116K, and the PE12 router 116L) will not have routes leading to the provider edge routers located in the Region A 120A. As a result, any data traffic emanating from any of the provider edge routers outside of Region A (e.g., the PE4 router 116D, the PE5 router 116E, the PE6 router 116F, the PE7 router 116G, the PE8 router 116H, the PE9 router 116I, the PE10 router 116J, the PE11 router 116K and the PE12 router 116L) must be transmitted to a corresponding regional scale router (e.g., the second regional scale router 118B, the third regional scale router 118C, the fourth regional scale router 118D) for subsequent forwarding to the first regional scale router 118A in the Region A 120A. Thus, all packets destined for the Region A 120A that originate outside of the Region A 120A will be forced through one or more of the second regional scale router 118B, the third regional scale router 118C, or the fourth regional scale router 118D to the first regional scale router 118A.

If the example service checker 305 determines that the first VPN route is designated to receive a data/communication service, the service checker 305 causes the first VPN route to be transmitted to the example route modifier 314. The example route modifier causes the first VPN route to be modified so that the data to be transmitted via the VPN route will be routed through the first regional scale router 118A, despite the fact that the first VPN route is a local route. The modifications begin when the next hop modifier 315 causes a first next hop address of the first VPN route to be replaced with a second next hop address of the first route. As illustrated in FIG. 1C, in some examples, the first next hop address included in the first BGP VPN route 154 identifies the PE1 router 116A and the second next hop address included in the first modified BGP VPN route 156 identifies the first regional router 118A. After the next hop is modified, the route distinguisher modifier 316 modifies the route distinguisher associated with the first BGP VPN route 154 to replace a first route distinguisher with a second route distinguisher. In the illustrated example of FIG. 1C, the first BGP VPN route 154 includes a first route distinguisher identifying the VRF-A 122 of the PE1 router 116A, with a second route distinguisher identifying the VRF-XA 130 associated with the first regional scale router 118A. The route distinguisher modifier 316 transmits the modified first BGP VPN route to the route originator-ID modifier 320 which replaces a first route originator-ID with a second route originator-ID. In the illustrated example of FIG. 1C, the first route originator-ID identifies the PE1 router 116A and the second route originator-ID identifies the first regional scale router 118A. Thus, the first regional scale router 118A will not later attempt to import/store the route data when the VPN route is reflected back to the first regional scale router 118A.

As described above, the VPN route was previously distributed via the first route reflector 138A to the provider edge routers of region A 120A (the PE1 router 116A, the PE2 router 116B, the PE3 router 116C) in its unmodified form. Thus, both the unmodified first BGP VPN route and modified first BGP VPN route provide access to the same customer destination IP address. To ensure that the modified BGP VPN route (and not the unmodified BGP route) is used by the provider edge routers (the PE1 router 116A, the PE2 router 116B, the PE3 router 116C) to route data packets to the destination associated with the route, before advertising the modified VPN route to the provider edge routers of Region A 120A (the PE1 router 116A, the PE2 router 116B, the PE3 router 116C), the VPN route is transmitted to the example preference value assigner 322 which assigns a preference value to the modified VPN route that exceeds a preference value associated with the unmodified VPN route (if any). After the preference value has been modified, the modified VPN route is stored in the reachability route table 326 and is then advertised to the local provider edge routers (the PE1 router 116A, the PE2 router 116B, the PE3 router 116C). Thus, when the modified VPN route data is advertised and subsequently stored by the PE1 router 116A, the PE2 router 116B and the PE3 router 116C of the Region A 120A, the VPN route having the highest preference value will be the preferred VPN route used by the provider edge router (i.e., the provider edge routers will choose the modified VPN route that is forced through the first regional scale router 118A instead of the unmodified VPN route that proceeds directly from one provider edge router in Region A to another provider edge router in Region A.)

Figure 4:
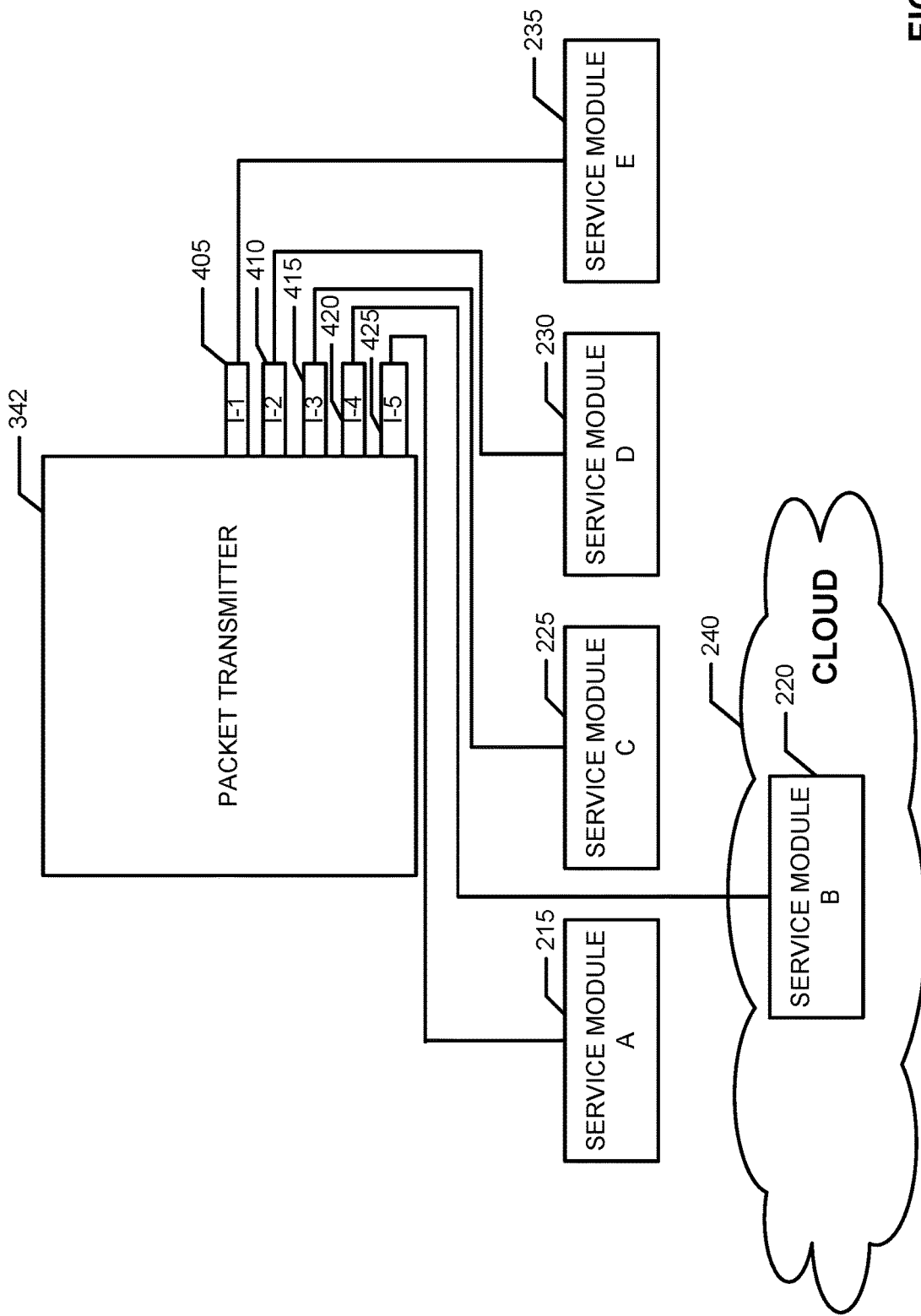
FIG. 4 is a block diagram illustrating an example packet transmitter and example interfaces to example service modules.

Referring now to FIG. 3 and to FIG. 4, when the example service checker 306 determines that data traversing the VPN route is to receive a service, the service checker 306 notifies the example service interface assignor 312. The service interface assignor 312 responds to the notification by determining which of the service modules (e.g., the service module A 215, the service module B 220, the service module C 225, the service module D 230 (see FIG. 2)) is adapted to provide the service that the VPN route is designated to receive. In some examples, the service module is identified using information contained in the route, using information stored in the routing rules 324, information in the data packet, etc. Once the appropriate service module is identified, an interface by which the example packet transmitter 342 of the example packet processor 210 is coupled to the service module is identified and associated with the first route. In the illustrated example of FIG. 4, the packet transmitter 342 of the packet processor 210 is adapted to transmit packets to the service module A 215, the service module B 220, the service module C 225, the service module D 230 and the service module E 235 via a first interface I-1 405, a second interface I-2 410, a third interface I-3 415, a fourth interface I-4 420, and a fifth interface I-5 425, respectively. In some examples, the service assigner 312 determines that data carried via the VPN route is to be supplied to the service module A 215 to receive service processing. In some such examples, the service interface assigner 312 identifies the fifth interface I-5 425 as being the interface by which the packet transmitter 342 is coupled to the service module A 215 and thereafter causes the fifth interface I-5 425 to be associated with the route. In some examples, the service interface assigner 312 associates the VPN route with the fifth interface I-5 425 by storing information identifying the fifth interface I-5 425 into the example local route table 332 with the route. Thus, as described below, when data is transmitted to the first regional scale router 118A on the route, the data will be processed by the packet processor 210 and the packet transmitter 342 will cause the data to be transmitted to the service module A via the fifth interface I-5 425. In some examples, a system administrator uses a manual router configuration process to associate a VPN route with a service module and a corresponding interface.

In some examples, one of the service modules (e.g., the service module A 215) is adapted to provide load balancing services. In some such examples, the service module A 215 is adapted to alternate traffic delivery between the PE1 router 116A, the PE2 router 116B and the PE3 router 116C. In some examples, the service module C 225 is adapted to provide services based on an application associated with a data packet. In some such examples, any data packets having header information associating such data packets with a particular application are supplied by the packet processor 210 (see FIG. 3) to the service module C 230 for service.

Each of the routes advertised by the provider edge routers in the Region A 120A (e.g., the PE1 router 116A, the PE2 router 116B, the PE3 router 116C) are processed in the manner described with reference to FIG. 2 thereby causing the example local route table 332 and the example reachability route table 326 to be populated with routes having a customer destination IP address located in the Region A 120A. Likewise, the routes advertised by the second regional router 118B, the third regional router 118C and the fourth regional router 118D are processed in the manner described with reference to FIG. 2 thereby causing the example non-local routing table 330 to be populated with non-local routes.

In the illustrated example, the example forwarding table generator 310 uses the VPN route information stored in the example local route table 332 and the example non-local route table 330 to generate the example forwarding table 328. In some examples, the forwarding table 328 contains a subset of the routes contained in the local route table 332 and the non-local route table 330. In some examples, the forwarding table generator 310 uses the routing rules 324 to select the subset of the routes in the local route table 332 and the non-local route table 330 for inclusion in the forwarding table 328.

In some examples, the example packet processor is configured to receive, process and transmit data packets based, at least in part, on information contained in the VRF-XA 130. Data packets transmitted by any of the provider edge routers of the Region A 120A (e.g., the PE1 router 116A, the PE2 router 116B, the PE3 router) and any of the remote regional scale routers (e.g., the second regional scale router 118B, the third regional scale router 118C, the fourth regional scale router 118D) are received at the packet receiver 334 and transmitted to the packet analyzer 336. The packet analyzer reviews the data packet to identify a customer destination IP address for the data packet. In some examples, the packet analyzer pops a label(s) attached to the received data packet to identify the customer destination IP address. The packet analyzer sends the data packet and associated customer destination IP address to the example route selector 338. The example route selector 338 uses the customer destination IP address to select a VPN route from the forwarding table 328. In some examples, the route selector may additionally use the routing rules 324 to select a VPN route from the forwarding table 328.

The route selector 324 supplies the selected VPN route to the example route labeler 340. In some examples, the example route labeler 340 uses the selected VPN route to identify labels (e.g., a multiple protocol label switching label) to attach to the data packet. The labels can include an inner label that identifies the customer destination IP address and an outer label that identifies the IP address of an appropriate one of the second regional scale router 118B, the third regional scale router 118C or the fourth regional scale router 118D. The example packet transmitter 342 causes the labeled data packet to be transmitted to the remote regional scale router identified in the packet label. In some examples, the provider network 112 includes one or more additional provider routers positioned to transmit data between the first regional scale router 118A, the second regional scale router 118B, the third regional scale router 118C, and the fourth regional scale router 118D. The additional provider routers included in the provider network do not store any information about the customer destinations (e.g., customer addresses) but are instead adapted to store routes to the regional scale routers (e.g., the first regional scale router 118A, the second regional scale router 118B, the third regional scale router 118C, the fourth regional scale router 118D). In some examples, the labeled data packet is transmitted by the regional scale router 118A to one of the additional provider routers which processes the label to identify a next provider router and so on until the labeled data packet reaches the intended remote regional scale router 118A. At the remote regional scale router, the outer label is popped and discarded and the inner label is popped to reveal the customer destination IP address to which the data packet is to be transmitted. The remote regional scale router forwards the data packet to an appropriate provider edge router based on a VPN route in the forwarding table having the customer destination address.

In some examples, the second regional scale router 118B, the third regional scale router 118C, and the fourth regional scale router 118D are configured to include the same components as the example first regional scale router 118A illustrated in FIG. 2 an FIG. 3. Additionally, the second regional scale router 118B, the third regional scale router 118C, and the fourth regional scale router 118D are configured to process routes received from the provider edge routers in the Region B 120B, the Region C 120C and the Region D 120D, respectively, and routes received from the other regional scale routers in the same manner as the first regional router 118A to thereby form the VRF-XB 132, the VRF-XC 134, and VRF-XD 136, respectively.

While an example manner of implementing the example regional scale router 118A of FIG. 1 has been illustrated in FIG. 2, FIG. 3 and FIG. 4, one or more of the elements, processes and/or devices illustrated in the FIG. 2, FIG. 3 and FIG. 4 can be combined, divided, re-arranged, omitted, eliminated and/or implemented in any other way. Further, any of the example VRF-XA 130, route processor 205, the example packet processor 210, the example service module A 215, the example service module B 220, the example service module C 225, the example service module D 230, the example service module E 235, the example route receiver 302, the example route source checker 304, the example service checker 306, the example route advertiser 308, the example forwarding table generator 310, the example service interface assignor 312, the example next hop modifier 315, the example route distinguisher modifier 316, the example route target modifier 318, the example route originator-ID modifier 320, the example preference value assignor 322, the example routing rules 324, the example reachability route table 326, the example forwarding table 328, the example non-local route table 330, the example local route table 332, the example packet receiver 334, the example packet analyzer 336, the example route selector 338, the example route labeler 340, and the example packet transmitter 342, the example first interface I-1 405, the example second interface I-2 410, the example third interface I-3 415, the example fourth interface I-4 420, and the example fifth interface I-5 425 and/or, more generally, the example first regional scale router 118A may be implemented by hardware, software, firmware and/or any combination of hardware, software and/or firmware. Thus, for example, any of the example VRF-XA 130, route processor 205, the example packet processor 210, the example service module A 215, the example service module B 220, the example service module C 225, the example service module D 230, the example service module E 235, the example route receiver 302, the example route source checker 304, the example service checker 306, the example route advertiser 308, the example forwarding table generator 310, the example service interface assignor 312, the example next hop modifier 315, the example route distinguisher modifier 316, the example route target modifier 318, the example route originator-ID modifier 320, the example preference value assignor 322, the example routing rules 324, the example reachability route table 326, the example forwarding table 328, the example non-local route table 330, the example local route table 332, the example packet receiver 334, the example packet analyzer 336, the example route selector 338, the example route labeler 340, and the example packet transmitter 342, the example first interface I-1 405, the example second interface I-2 410, the example third interface I-3 415, the example fourth interface I-4 420, and the example fifth interface I-5 425 and/or, more generally, the example first regional scale router 118A could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example VRF-XA 130, route processor 205, the example packet processor 210, the example service module A 215, the example service module B 220, the example service module C 225, the example service module D 230, the example service module E 235, the example route receiver 302, the example route source checker 304, the example service checker 306, the example route advertiser 308, the example forwarding table generator 310, the example service interface assignor 312, the example next hop modifier 315, the example route distinguisher modifier 316, the example route target modifier 318, the example route originator-ID modifier 320, the example preference value assignor 322, the example routing rules 324, the example reachability route table 326, the example forwarding table 328, the example non-local route table 330, the example local route table 332, the example packet receiver 334, the example packet analyzer 336, the example route selector 338, the example route labeler 340, and the example packet transmitter 342, the example first interface I-1 405, the example second interface I-2 410, the example third interface I-3 415, the example fourth interface I-4 420, and the example fifth interface I-5 425 and/or the example regional scale router 118A is/are hereby expressly defined to include a tangible computer readable storage device or storage disk such as a memory, a digital versatile disk (DVD), a compact disk (CD), a Blu-ray disk, etc. storing the software and/or firmware. Further still, the example first regional scale router 118A of FIG. 1, FIG. 2, FIG. 3 and FIG. 4 may include one or more elements, processes and/or devices in addition to, or instead of, those illustrated in FIG. 1, FIG. 2, FIG. 3 and FIG. 4, and/or may include more than one of any or all of the illustrated elements, processes and devices.

Figure 5:
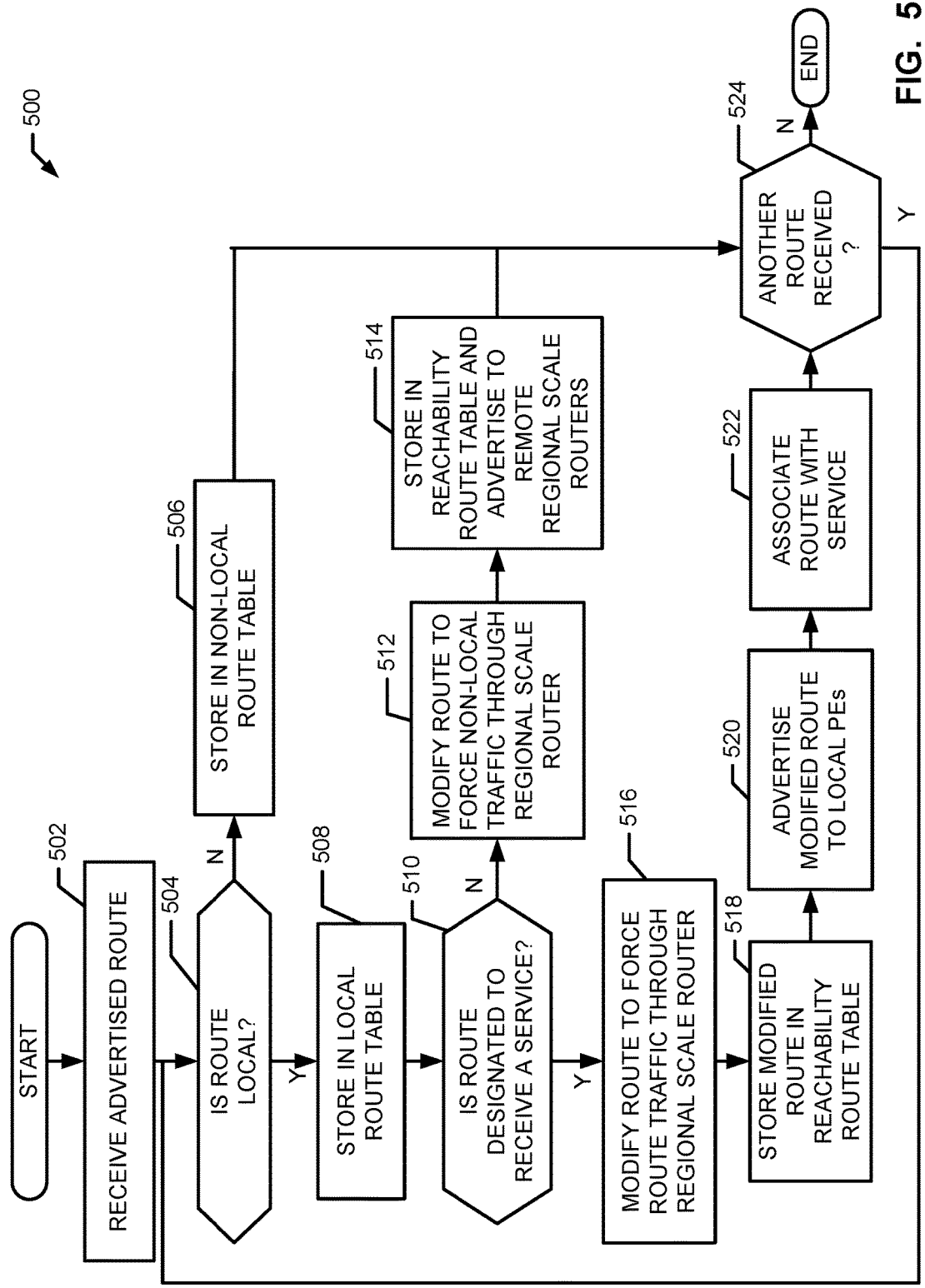
FIG. 5 is a flowchart representative of example computer readable instructions that can be executed by the example regional scale routers of FIG. 1 to FIG. 4.

Flowcharts representative of example machine readable instructions for implementing the example regional scale router 118A of FIG. 1, FIG. 2, FIG. 3 and FIG. 4 are shown in FIG. 5. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example programs are described with reference to the flowchart illustrated in FIG. 5 many other methods of implementing the example first regional scale router 118A may alternatively be used. For example, the order of execution of the blocks may be changed, and/or some of the blocks described may be changed, eliminated, or combined.

As mentioned above, the example processes of FIGS. 5, 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 5, FIG. 6 and FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Example machine readable instructions 500 that may be executed to implement the first regional scale router 118A of FIGS. 1, 2, 3 and 4 are represented by the flowchart shown in FIG. 5. The example machine readable instructions 500 may be executed periodically and/or aperiodically (e.g., at predetermined intervals, based on an occurrence of a predetermined event, etc., or any combination thereof). The machine readable instructions 500 begin execution at a block 502 of FIG. 5 at which a first VPN route is received at the example route receiver 302 (see FIG. 3) and then transmitted to the example route source checker 304 (see FIG. 5). The route source checker 304 checks to determine whether the VPN route is a local route (e.g., is associated with a customer site 110A, 110B, 110C located in the Region A 120A) (block 504). If the route source checker 304 determines that the VPN route is not local (e.g., the customer destination IP address is not located in the Region A 120A), the route source checker 304 causes the VPN route to be stored in the example non-local route table 330 (see FIG. 3) containing non-local routes (block 506). The non-local routes stored in the non-local route table 330 are used by the first regional scale router 118A to transmit data packets intended for non-local destinations (e.g., a customer site located in any of Region B, Region C and/or Region D).

If the example route source checker 304 determines that the first VPN route is local (block 504), the route source checker 304 causes the first VPN route to be stored in the example local route table 332 (see FIG. 2) which contains local routes (block 508) (e.g., routes that terminate at one of the customer sites 110A, 110B, 110C located in the Region A 120A). The routes stored in the local routing table are used by the first regional scale router 118A to forward traffic received from remote regions (e.g., the Region B 120B, the Region C 120C, the Region D 120D) (and, in some cases, received from the Region A) to a local provider edge router of the Region A 120A (e.g., the PE1 router 116A, the PE2 router 116B, the PE3 router 116C).

After the first VPN route is stored, the example service checker 306 (see FIG. 3) determines whether the first VPN route is designated to be given access to a service (e.g., broadband, voice over IP, software as a service, storage as a service, enhanced speed, etc.) (block 510). In some examples, the service checker 306 makes the determination by examining the first VPN route for data indicating that the first VPN route is to be given access to a service. In some examples, the service checker 306 makes the determination by comparing the first VPN route to a list of service routes stored in the example routing rules 324 (see FIG. 3) of the VRF-XA 130. In some examples, the service checker 306 makes the determination based on service subscription information stored in the VRF-XA 130.

If the VPN route is not designated for access to a service, the example service checker 306 causes the first VPN route to be modified by the example route modifier 314 (see FIG. 3) (block 512). The route modifications begin when the first VPN route is transmitted to the example next hop modifier 315 (see FIG. 3) at which the IP address representing the next hop router (e.g., the IP address of the example PE1 router 116A) is replaced with the IP address of the example first regional scale router 118A. Thus, after the replacement, the next hop address of the first VPN route identifies the IP address of the first regional scale router 118A instead of the IP address of the PE1 router 116A. The first VPN route is also supplied to the example route distinguisher modifier 316 (see FIG. 3) which replaces a first route distinguisher of the first VPN route with a second route distinguisher. As described above, a route distinguisher distinguishes one set of routes associated with a first VRF or customer from another set of routes associated with a different VRF or customer. As is further described above, the route distinguisher takes the form of a unique number prepended to each VPN route within a VRF and identifies the VPN route as belonging to that VRF (or customer). Thus, the first VPN route received at the example first regional scale router 118A and advertised by the PE1 router 116A includes a first route distinguisher that identifies the example VRF-A 122 (see FIG. 1). The route distinguisher modifier 316 replaces the first route distinguisher that identifies the VRF-A 122 with a second route distinguisher that identifies the example VRF-XA 130 residing in the first regional scale router 118A.

Next, the example route target modifier 318 (see FIG. 3) modifies the route target of the route. As described above, the route target identifies the router(s) that are to import and store the VPN route data. The route target modifier replaces a first route target with a second route target. In some examples, the first route target identifies all of the routers in the Region A 120A included in the VPN 100 (e.g., the PE1 router 116A, the PE2 router 116B, the PE3 router 116C and the first regional scale router 116A) and the second route target identifies the second regional scale router 116B, the third regional scale router 116C, and the fourth regional scale router 116D. Thus, when the first VPN route is later advertised by the first regional scale router 116A, the modifications to the route target will cause the modified VPN route to be imported and stored in the second regional scale router 116B, the third regional scale router 116C, and the fourth regional scale router 116D. As a result, the regional scale routers, and not the provider edge routers, will store the non-local routes thereby offloading storage of the non-local routes from the provider edge routers of the VPN 100.

After the route target is modified, the example route originator-ID modifier 318 (see FIG. 3) replaces a first route originator-ID included in the first VPN route with a second route originator-ID. As described above, the route originator-ID identifies a router in the service provider network at which the VPN route originated (e.g., the route's point of ingress to the service provider network from a customer site). A route originator-ID is added to a VPN route so that later, when the same VPN route is advertised to the originating router by another network router and/or route reflector, the originating router will recognize the VPN route as being native to the router (e.g., having originated at the router) and will not attempt to import/save the VPN route data. Thus, the route originator-ID prevents loop back and/or route table flapping. In some examples, the first route originator ID included in the first VPN route identifies the provider edge router from which the VPN route data originated (e.g., the PE1 router 116A) and the second route originator identifies the example first regional scale router 118A. As a result of modifying the route originator-ID, the first regional scale router 118A will recognize the first VPN route as having originated at the first regional scale router 118A when the first VPN route is advertised to the first regional scale router 118A and, thus, will not attempt to import or store the first route.

After having been modified in the manner described above, the modified first VPN route is stored in the example reachability route table 326 (see FIG. 3) of the example VRF-XA 130 and then advertised by the example route advertiser 308 (block 514). When the modified, first VPN route is advertised, the route targets (e.g., the example second regional scale router 118B, the example third regional scale router 118C, and the example fourth regional scale router 118D) import and store the modified, first VPN route in one or more non-local data routing tables. As a result, the second regional scale router 118B, the third regional scale router 118C and the fourth regional scale router 118D will store routes leading to the example first regional scale router 118A and the first regional scale router 118A will store local routes leading to the provider edge routers located in the Region A 120A (e.g., the PE1 router 116A, the PE2 router 116B and the PE3 router 116C). In contrast, the provider edge routers located outside of the Region A 120A (e.g., the PE4 router 116D, the PE5 router 116E, the PE6 router 116F, the PE7 router 116G, the PE8 router 116H, the PE9 router 116I, the PE10 router 116J, the PE11 router 116K, and the PE12 router 116L) will not have routes leading to the provider edge routers located in the Region A 120A. As a result, any data traffic emanating from any of the provider edge routers outside of Region A (e.g., the PE4 router 116D, the PE5 router 116E, the PE6 router 116F, the PE7 router 116G, the PE8 router 116H, the PE9 router 116I, the PE10 router 116J, the PE11 router 116K and the PE12 router 116L) must be transmitted to a corresponding regional scale router (e.g., the second regional scale router 118B, the third regional scale router 118C, the fourth regional scale router 118D) for subsequent forwarding to the first regional scale router 118A in the Region A 120A. Thus, all packets originating outside of the Region A 120A but destined for the Region A 120A will be forced through one or more of the second regional scale router 118B, the third regional scale router 118C, and the fourth regional scale router 118D to the first regional scale router 118A.

Referring still to FIG. 5, if the example service checker 306 determines that the first VPN route is designated to receive access to a service (block 510), the service checker 306 causes the example route modifier 314 (see FIG. 3) to modify the first VPN route (block 516) in a manner that forces the first VPN route traffic through the example first regional scale router 118A where the route traffic accesses the service. Thus, instead of supplying such services at each provider edge router (e.g., the PE1 router 116A, the PE2 router 116B, the PE3 router 116C) the service is supplied to the local VPN route at the first regional scale router 118A. As a result, less expensive routers having less capability can be deployed at the provider's edge and fewer, more expensive, higher capacity routers having the ability to supply such service can be deployed at the regional level.

To effect the modification needed to force the first VPN route through the example first regional scale router 118A, the first VPN route is supplied to the example route distinguisher modifier 316 which replaces the route distinguisher (the example VRF-A 122) associated with the PE1 router 116A, with the route distinguisher (the example VRF-XA 130) associated with the first regional scale router 118A. Next, the example route originator-ID modifier 320 replaces the route originator-ID of the first VPN route with a route originator-ID that identifies the first regional scale router 116A as the route originator. Thus, when the VPN route is advertised by the first regional scale router 118A, the first regional scale router 118A will not later attempt to import/store the VPN route data when the VPN route is reflected back to the first regional scale router 118A. In addition, the example preference value assigner 322 (see FIG. 3) assigns a preference value to the modified first VPN route that exceeds the preference value (if any) assigned to the unmodified first route, to thereby ensure that the modified first VPN route (and not the unmodified first route) is used by the provider edge routers (the PE1 router 116A, the PE2 router 116*b*, and the PE3 router 116C) to route data packets.

After the preference value has been modified, the modified first VPN route is stored in the example reachability table 326 (block 518) and is then advertised to the local provider edge routers (the example PE1 router 116A, the example PE2 router 116B, and the example PE3 router 116C) (block 520).

In addition, the example service interface assignor 312 (see FIG. 3) associates the first VPN route with a router interface by which the first VPN route can access the service (block 522). In some examples, the service interface assignor 312 makes the association by first identifying a service module (the example service module A 215 (see FIG. 2), the example service module B 220 (see FIG. 2), the example service module C 225 (see FIG. 2), the example service module D 230), and the example service module E 235 (see FIG. 2)) to which the first VPN route is to be given access. The service module can be identified by the service interface assignor 312 using information contained in the first VPN route itself, using information stored in the routing rules 324, using information supplied by a system administrator, using information provided by an automated provisioning and orchestration system, using information contained in a data packet being transmitted, etc. Once the appropriate service module is identified, an interface by which the example packet transmitter 342 (see FIG. 3) is coupled to the identified service module is also identified and associated with the first route. In some examples, the service assigner 312 determines that data carried on the first VPN route is to be given access to the service supplied by the service module A 215. As a result, the service interface assignor 312 causes the example fifth interface I-5 425 (see FIG. 4) to be associated with the first route. In some examples, the service interface assigner 312 associates the first VPN route with the fifth interface I-5 425 by storing information identifying the fifth interface I-5 425 into an entry in the example local route table 332 corresponding to the first route. Thus, when data is transmitted to the example first regional scale router 118A on the first route, the data will be processed by the example packet processor 210 (see FIG. 2) and the example packet transmitter 342 will cause the data to be transmitted to the service module A via the fifth interface I-5 425. In some examples, a system administrator uses a manual router configuration process to associate a VPN route with a service module and a corresponding interface. In some examples, a VPN route is associated with more than one service module so that multiple services can be accessed by data packets traveling on the first route.

After the modified first VPN route is advertised the example route receiver 302 determines whether another VPN route has been received (block 524). If another VPN route has been received at the example route receiver 302, the method returns to the block 504 and the blocks subsequent thereto, as described above. If another VPN route has not been received, the method ends.

As described above, each of the routes advertised by the PE routers in the Region A 120A are processed in the manner described with reference to FIG. 2 thereby causing the local routing table to be populated with local routes. Likewise, the routes advertised by the second regional router 118B, the third regional router 118C and the fourth regional router 118D are processed in the manner described with reference to FIG. 5 thereby causing the non-local routing table to be populated with non-local routes. In some examples, the example forwarding table generator 310 (see FIG. 3) periodically selects routes from the local and non-local routing tables and stores the selected routes in the example forwarding table 328 (see FIG. 3). Although for illustrative purposes, the first regional scale router 118A is described as processing the received routes individually, in some examples, the first regional scale router 118A is configured to process multiple routes at a same time. Further, although the modifications performed by the route modifier 314 (see FIG. 3) are described as being performed in a particular order (e.g., the next hop is modified first, then the route distinguisher, etc.), the modifications can be performed by the route modifier 314 in any order.

In some examples, the provider edge routers in any given region (e.g., the PE1 router 116A, the PE2 router 116B, the PE3 router 116C of the Region A 120A) are configured to store the non-local VPN routes (e.g., VPN routes to customer destinations located in remote regions). In some such examples, the first regional scale router 118A is configured to receive VPN routes from the second regional scale router 118B, the third regional scale router 118C and/or the fourth regional scale router 118D) and is further configured to modify the route target of such incoming VPN routes to identify a route target corresponding to the PE1 router 116A, the PE2 router 116B and the PE3 router 116C. The first regional scale router 118A, after modifying the route target in the desired manner, advertises the VPN routes to the PE1 router 116A, the PE2 router 116B and the PE3 router 116C which import the VPN routes for subsequent use in forwarding data packets to corresponding customer destinations. In some such examples, the first regional scale router 118A remains responsible for supplying access to one or more of the service modules (e.g., the example service module A 215, the example service module B 220, the example service module C 225, the example service module D 230, and/or the example service module 235). In some such examples, only the VPN route information corresponding to VPN routes that are not scheduled to carry traffic that requires access to any of the service modules is stored in the provider edge routers (e.g., PE1 router 116A, the PE2 router 116B, and the PE3 router 116C).

Figure 6:
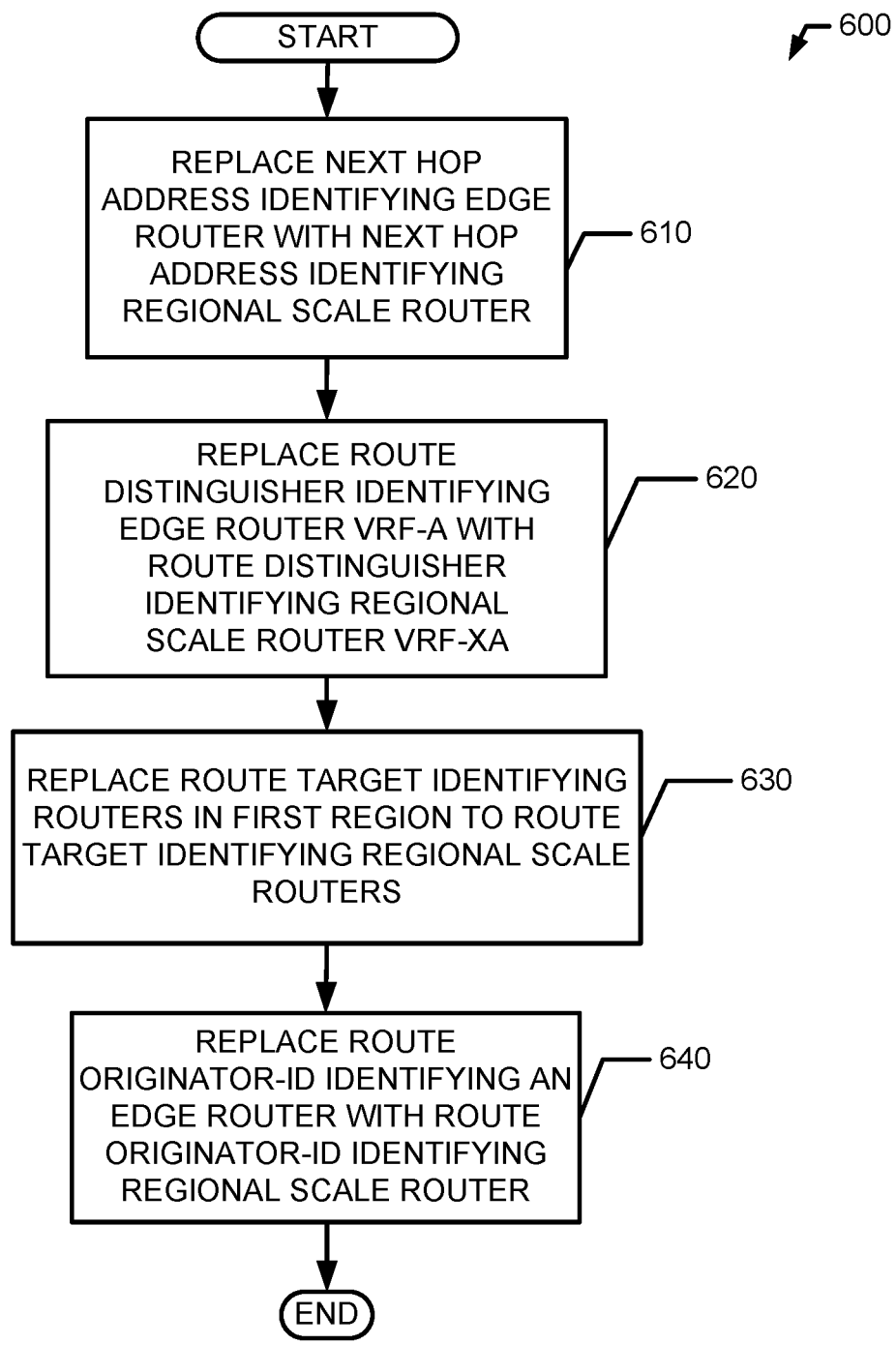
FIG. 6 is a flowchart representative of example computer readable instructions that can be executed by the example route modifier of FIG. 3.

Example machine readable instructions 600 that may be executed to implement the example route modifier 314 of FIG. 3 are represented by the flowchart shown in FIG. 6. The example machine readable instructions 600 may be executed periodically and/or aperiodically (e.g., at predetermined intervals, based on an occurrence of a predetermined event, etc., or any combination thereof). The machine readable instructions 600 begin execution at a block 610 of FIG. 6 at which the example next hop modifier 315 replaces a first next hop address of a VPN route supplied to the example route processor 205 (see FIG. 3) by the PE1 router 116A (see FIG. 1) with a second next hop address. The first next hop address identifies the address of the PE1 router 116A and the second next hop address identifies the address of the regional scale router 118A (see FIG. 3). After the next hop address is replaced, the example route distinguisher modifier 316 replaces a first route distinguisher of the VPN route with a second route distinguisher (block 620). In some examples, the first route distinguisher identifies the example VRF-A 122 (see FIG. 1) and the second route distinguisher identifies the VRF-XA 130 (see FIG. 1, FIG. 2, and FIG. 3). Next, the example route target modifier 318 replaces the first route target identifying the VPN routers in the Region A 120A (e.g., the PE1 router 116A, the PE2 router 116B, the PE3 router 116C, and the first regional scale router 118A (see FIG. 1)) with a second router target identifying the example regional routers 118A, 118B, 118C, 118D (see FIG. 1) (block 630). Additionally, the example router originator-ID modifier 320 (see FIG. 3) replaces a first route originator-ID with a second route originator-ID (block 640). In some examples, the first route originator-ID identifies the PE1 router 116A and the second route originator-ID identifies the first regional scale router 118A. After all such modifications are made, the route modifying method ends.

Figure 7:
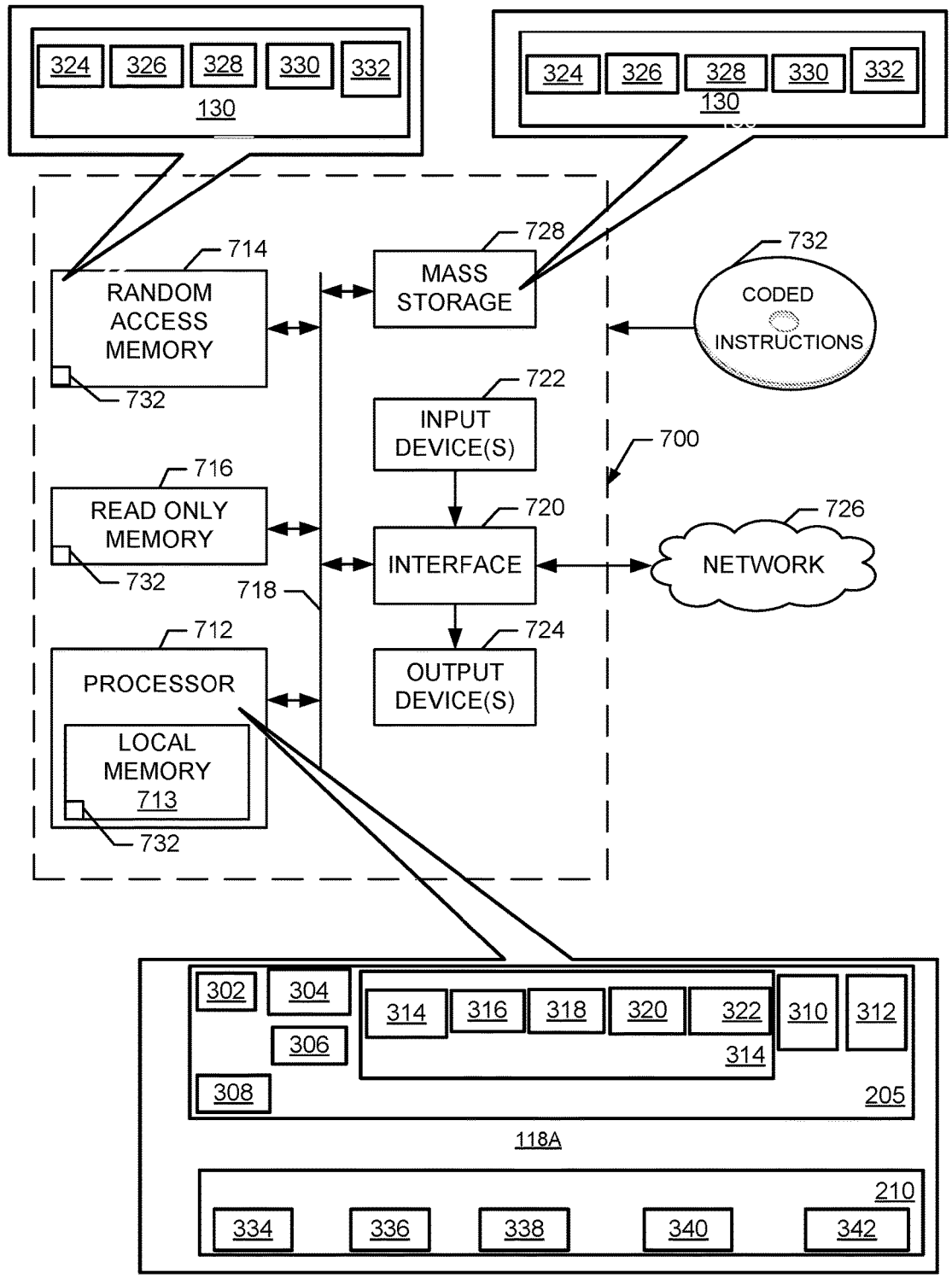
FIG. 7 is a block diagram of an example processing system that may execute example machine readable instructions of FIG. 5 and FIG. 6 to implement the example systems of FIGS. 1, 2, 3, and/or 4.

FIG. 7 is a block diagram of an example processor platform 700 capable of executing the instructions of FIG. 5, FIG. 6 and/or FIG. 7 to implement the first regional scale router 118A, the example route processor 205, the example packet processor 210, the example route receiver 302, the example route source checker 304, the example service checker 306, the example route advertiser 308, the example next hop modifier 315, the example route distinguisher modifier 316, the example route target modifier 318, the example route originator-ID modifier 320, the example preference value assigner 322, the example forwarding table generator 310, the example service interface assigner 312, the example route modifier 314, the example packet receiver 334, the example packet analyzer 336, the example route selector 338, the example route labeler 340, the example packet transmitter 342 of FIGS. 1, 2, 3, and 4. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. Any of the random access memory device 714 and the mass storage 728 can be used to implement the example VRF-XA 130, the example routing tables 324, the example reachability route table 326, the example forwarding table 328, the example non-local route table 330, the example local route table 332 of FIG. 1, FIG. 2 and FIG. 3.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In some examples, the mass storage 728 can be used to implement the VRF-XA 130, the routing rules 324, the reachability route table 326, the forwarding table 328, the non-local route table 330, and the local route table 332 of FIGS. 1, 2, and 3.

Coded instructions 732 corresponding to the instructions of FIG. 5 and/or FIG. 6, may be stored in the mass storage device 728, in the volatile memory 714, in the non-volatile memory 716, and/or on a removable tangible computer readable storage medium such as a CD or DVD.

At least some of the above described example methods and/or apparatus are implemented by one or more software and/or firmware programs running on a computer processor. However, dedicated hardware implementations including, but not limited to, application specific integrated circuits, programmable logic arrays and other hardware devices may likewise be constructed to implement some or all of the example methods and/or apparatus described herein, either in whole or in part. Furthermore, alternative software implementations including, but not limited to, distributed processing or component/object distributed processing, parallel processing, or virtual machine processing may also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software.

Thus, the methods, systems, apparatus and articles of manufacture disclosed herein off-load non-local routes from the provider edge router to a regional scale router and cause all non-local traffic to be routed through the regional scale router. By removing non-local VPN routes from the provider edge routers, the amount of routing information stored at the provider edge routers is greatly reduced, thereby easing the processing and memory demands placed on the limited-capacity provider edge routers. Similarly, because enhanced data services are applied at the regional scale router instead of being applied at each individual provider edge router, the number of sophisticated routers having the capacity needed to supply enhanced data services is reduced, thereby resulting in lower cost. In addition, the methods, systems and apparatus described herein provide enhanced traffic routing capabilities by providing the ability to restrict communication between regions, as desired.

Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to route traffic in a virtual private network, the method comprising:
   replacing, by executing an instruction with a processor at a first provider router, a first next hop address included in first route information with a second next hop address, the first next hop address identifying a first edge router of a plurality of edge routers in a first region and the second next hop address identifying the first provider router, the first provider router not being at an edge of a provider network included in the virtual private network, the first provider router located in the first region and the first route information identifying a first route to a customer address in a customer network coupled to the first edge router;
   determining, by executing an instruction with the processor, whether data traffic to traverse the first route is to access a service to be provided within the same virtual private network in the first region; and
   advertising, by executing an instruction with the processor, the first route information having the second next hop address to the plurality of edge routers within the same virtual private network in the first region in response to the determining that the data traffic to traverse the first route is to access the service to be provided within the same virtual private network in the first region.

2. The method of claim 1, wherein the advertisement of the second next hop address is only to the edge routers within the virtual private network, and further including after the replacing of the first next hop address with the second next hop address, advertising the first route information to a second provider router in a second region, the first route information to cause the second provider router to direct data traffic intended for the customer address identified in the first route information to the first provider router.

3. The method defined in claim 2, wherein the plurality of edge routers is a first plurality of edge routers, the method further including: before advertising the first route information to the second provider router, replacing a first route target identifying a second plurality of edge routers with a second route target, the second route target not identifying edge routers.

4. The method defined in claim 3, wherein the first route information further includes a first route distinguisher associated with a first virtual forwarding and routing instance at the first edge router, the method further including: before advertising the route information, replacing the first route distinguisher with a second route distinguisher associated with a second virtual forwarding and routing instance at the first provider router.

5. The method of claim 2, further including:
   storing the first route information in a forwarding table in the first provider router, the first route information stored in the forwarding table to be used by the first provider router to forward a data packet received from the second provider router to the first edge router, the storing to occur before the replacing of the first next hop address with the second next hop address.

6. The method defined in claim 2, wherein the service is only provided to data traffic traveling between the first plurality of edge routers in the first region.

7. The method defined in claim 2, wherein the first hop address is not changed when the data traffic is not to access the service provided within the virtual private network at the first provider router.

8. The method of claim 1, further including:
   preventing second route information received from a router located outside of the first region from being advertised to the plurality of edge routers located in the first region.

9. The method of claim 1, wherein the replacing of the first next hop address with the second next hop address causes the first route information to define a second route to the customer address, the method further including:
   before the advertising of the first route information to the plurality of edge routers, assigning a preference value to the first route information, the preference value to cause the second route to be preferred over the first route.

10. A tangible computer readable storage device comprising computer readable instructions which, when executed, cause a computer to perform operations including:
    replacing a first next hop address included in first route information with a second next hop address, the first next hop address identifying a first edge router of a plurality of edge routers in a first region and the second next hop address identifying a first provider router, the first provider router not being at an edge of a provider network included in the virtual private network, the first provider router located in the first region, and the first route information identifying a first route to a customer address in a customer network coupled to the first edge router;
    determining whether data traffic to traverse the first route is to access a service to be provided within the virtual private network in the first region; and
    advertising the first route information having the second next hop address to the plurality of edge routers within the virtual private network in the first region in response to the determining that the data traffic to traverse the first route is to access the service to be provided within the virtual private network in the first region.

11. The tangible computer readable storage device of claim 10, wherein the advertisement of the second next hop address is only to the edge routers within the virtual private network, and the operations further include, after the replacing of the first next hop address with the second next hop address, advertising the first route information to a second provider router in a second region, the first route information to cause the second provider router to direct data traffic intended for the customer address to the first provider router.

12. The tangible computer readable storage device of claim 11, wherein the route information further includes a first route distinguisher associated with a first virtual forwarding and routing instance at the edge router, and the operations further include:
    before advertising the first route information, replacing the first route distinguisher with a second route distinguisher, the second route distinguisher being associated with a second virtual forwarding and routing instance at the first provider router.

13. The tangible computer readable storage device of claim 11, wherein the operations further include, before the replacing of the first next hop address with the second next hop address, storing the first route information in a forwarding table in the first provider router, the route information stored in the forwarding table to be used by the first provider router to forward a data packet received from the second provider router to the first edge router.

14. The tangible computer readable storage device of claim 10, wherein the route is a first route and the replacing of the first next hop address with the second next hop address causes the first route information to define a second route to the customer address, and the operations further include assigning a preference value to the first route information after the replacing of the first next hop address with the second next hop address, the preference value to cause the second route to be preferred over the first route.

15. An apparatus to direct traffic in a virtual private network, the apparatus comprising:
   memory including machine readable instructions; and
   a processor to execute the instructions to perform operations including:
      replacing a first next hop address included in first route information with a second next hop address, the first next hop address identifying a first edge router of a plurality of edge routers in a first region and the second next hop address identifying a first provider router, the first provider router not being at an edge of a provider network included in the virtual private network the first provider router located in the first region, and the first route information identifying a first route to a customer address in a customer network coupled to the first edge router;
      determining whether data traffic to traverse the first route is to access a service to be provided within the virtual private network in the first region; and
      advertising the first route information having the second next hop address to the plurality of edge routers within the virtual private network in the first region in response to the determining the data traffic to traverse the first route is to access the service to be provided within the virtual private network in the first region.

16. The apparatus of claim 15, wherein the advertisement of the second next hop address is only to the edge routers within the virtual private network, and the operations further include after the replacing of the first next hop address with the second next hop address, advertising the first route information to a second provider router in a second region, the first route information to cause the second provider router to direct data traffic intended for the customer address to the first provider router.

17. The apparatus of claim 16, wherein the first route information includes a first route target identifying a second edge router, and the operations further include before advertising the first route information to the second provider router, replacing the first route target with a second route target, the second route target identifying the second provider router.

18. The apparatus of claim 17, wherein the second route target is not to include edge routers.

19. The apparatus of claim 15, wherein the route information further includes a first route distinguisher associated with a first virtual forwarding and routing instance at the first edge router, and the operations further include before advertising the first route information, replacing the first route distinguisher with a second route distinguisher, the second route distinguisher being associated with a second virtual forwarding and routing instance at the first provider router.

20. The apparatus of claim 15, wherein the route is a first route and the replacing of the first next hop address with the second next hop address causes the first route information to define a second route to the customer address, and the operations further include assigning a preference value to the first route information after the replacing of the first next hop address with the second next hop address, the preference value to cause the second route to be preferred over the first route.

* * * * *